US011157886B2

(12) United States Patent
Winsor et al.

(10) Patent No.: US 11,157,886 B2
(45) Date of Patent: Oct. 26, 2021

(54) CANTILEVERED WEIGHT SENSITIVE SHELF, RAIL, AND MOUNTING SYSTEM

(71) Applicant: VIATOUCH MEDIA INC., New York, NY (US)

(72) Inventors: James Winsor, Riverside, CA (US); Thomas Murn, San Diego, CA (US); Robert Hurtado, Corona, CA (US); Milan Alvarado, Riverside, CA (US)

(73) Assignee: ViaTouch Media Inc., New York, NY (US)

( * ) Notice: Subject to any disclaimer, the term of this patent is extended or adjusted under 35 U.S.C. 154(b) by 59 days.

(21) Appl. No.: 16/483,361

(22) PCT Filed: Feb. 2, 2018

(86) PCT No.: PCT/US2018/016668
§ 371 (c)(1),
(2) Date: Aug. 2, 2019

(87) PCT Pub. No.: WO2018/144882
PCT Pub. Date: Aug. 9, 2018

(65) Prior Publication Data
US 2019/0378104 A1 Dec. 12, 2019

Related U.S. Application Data

(60) Provisional application No. 62/586,659, filed on Nov. 15, 2017, provisional application No. 62/536,811,
(Continued)

(51) Int. Cl.
*G06Q 20/18* (2012.01)
*G06K 7/10* (2006.01)
*G07F 11/38* (2006.01)

(52) U.S. Cl.
CPC ......... *G06Q 20/18* (2013.01); *G06K 7/10297* (2013.01); *G06K 7/10366* (2013.01); *G07F 11/38* (2013.01)

(58) Field of Classification Search
CPC .... G06Q 20/18; G06Q 20/20; G06K 7/10297; G06K 7/10366; G07F 11/38; G07F 9/026; G07G 1/0063
(Continued)

(56) References Cited

U.S. PATENT DOCUMENTS 5,997,928 A 12/1999 Kaish et al.
8,140,185 B2 3/2012 Simmons et al.
(Continued)

FOREIGN PATENT DOCUMENTS

WO 2018112089 A1 6/2018

OTHER PUBLICATIONS

Extended European Search Report issued in European Application No. 17881917.3 dated Oct. 19, 2019, 7 pages.
(Continued)

*Primary Examiner* — Garcia Ade
(74) *Attorney, Agent, or Firm* — Weber Rosselli & Cannon LLP

(57) ABSTRACT

A rack assembly for use with an automatic retail device. The rack assembly includes a rack body comprising and a load bar configured to mount to the rack body. The rack body includes a fastening element configured to mount the rack body to a portion of the automatic retail device and a main shelf controller disposed within the rack body and in communication with a microcontroller of the automatic retail device. The load bar includes a weight sensor configured to sense a weight of products positioned on the load bar and a circuit board. The circuit board is disposed on the load bar and in electrical communication with the weight sensor and
(Continued)

the main shelf controller. The circuit board transmits a signal corresponding to the weight sensed by the weight sensor to the microcontroller via the main shelf controller.

12 Claims, 26 Drawing Sheets

Related U.S. Application Data filed on Jul. 25, 2017, provisional application No. 62/454,551, filed on Feb. 3, 2017.

(58) Field of Classification Search
USPC .......................................................... 705/23
See application file for complete search history.

(56) References Cited

U.S. PATENT DOCUMENTS

| | | |
|---|---|---|
| 9,224,137 B1 | 12/2015 | Tomasi et al. |
| 9,898,884 B1 | 2/2018 | Arora et al. |
| 10,242,394 B2 | 3/2019 | Dabiri |
| 2001/0025883 A1 | 10/2001 | Ichihara et al. |
| 2002/0038167 A1 | 3/2002 | Chirnomas |
| 2002/0077724 A1 | 6/2002 | Paulucci et al. |
| 2002/0087413 A1 | 7/2002 | Mahaffy et al. |
| 2004/0186620 A1 | 9/2004 | Chirnomas |
| 2005/0171854 A1* | 8/2005 | Lyon .................. G01G 19/4144 705/24 |
| 2005/0285716 A1 | 12/2005 | Denison et al. |
| 2006/0015435 A1 | 1/2006 | Nathanson |
| 2007/0050271 A1 | 3/2007 | Ufford et al. |
| 2007/0235465 A1 | 10/2007 | Walker et al. |
| 2008/0103939 A1* | 5/2008 | Gibb .................... G06Q 10/087 705/28 |
| 2009/0119168 A1 | 5/2009 | Otto et al. |
| 2010/0057871 A1 | 3/2010 | Kaplan et al. |
| 2010/0100236 A1 | 4/2010 | Segal et al. |
| 2011/0301749 A1 | 12/2011 | Hammonds et al. |
| 2011/0313775 A1 | 12/2011 | Laligand et al. |
| 2012/0004769 A1 | 1/2012 | Hallenbeck et al. |
| 2012/0200385 A1* | 8/2012 | Savage .............. G06Q 10/0875 340/5.7 |
| 2013/0231776 A1 | 9/2013 | Kuehnrich et al. |
| 2014/0222195 A1 | 8/2014 | Bruck et al. |
| 2014/0297487 A1 | 10/2014 | Bashkin |
| 2014/0316916 A1* | 10/2014 | Hay ........................ A47F 9/048 705/17 |
| 2015/0058163 A1 | 2/2015 | Lenahan et al. |
| 2015/0105901 A1 | 4/2015 | Joshi et al. |
| 2015/0254760 A1 | 9/2015 | Pepper |
| 2015/0287123 A1 | 10/2015 | Holman et al. |
| 2015/0310411 A1 | 10/2015 | Lindfeldt |
| 2015/0317586 A1 | 11/2015 | Kassman |
| 2016/0098831 A1 | 4/2016 | Glickman et al. |
| 2016/0216106 A1 | 7/2016 | Motoyama |
| 2016/0379287 A1 | 12/2016 | Dabiri |
| 2017/0053650 A1 | 2/2017 | Ogawa |
| 2017/0148005 A1 | 5/2017 | Murn |
| 2017/0255896 A1 | 9/2017 | Dyke |
| 2019/0251776 A1 | 8/2019 | Adelberg et al. |

OTHER PUBLICATIONS

U.S. Office Action issued in U.S. Appl. No. 16/066,559 dated Jul. 28, 2020, 18 pages.
PCT Search Report and Written Opinion issued in corresponding PCT Application No. PCT/US18/16668 dated Apr. 26, 2018, 9 pages.
Non-Final Rejection issued in U.S. Appl. No. 16/483,358 dated Jan. 26, 2021.
Notice of Allowance issued in U.S. Appl. No. 16/066,559 dated Jan. 13, 2021, 18 pages.
Summons to attend oral proceedings pursuant to Rule 115(1) EPC issued in European Patent Application No. 17881917.3 dated Feb. 2, 2021.
U.S. Final Office Action issued in U.S. Appl. No. 16/483,358 dated Jun. 14, 2021.
Notice of Reasons for Rejection issued in Japanese Patent Application No. 2020-127885 dated Jul. 20, 2021 with English translation.

* cited by examiner

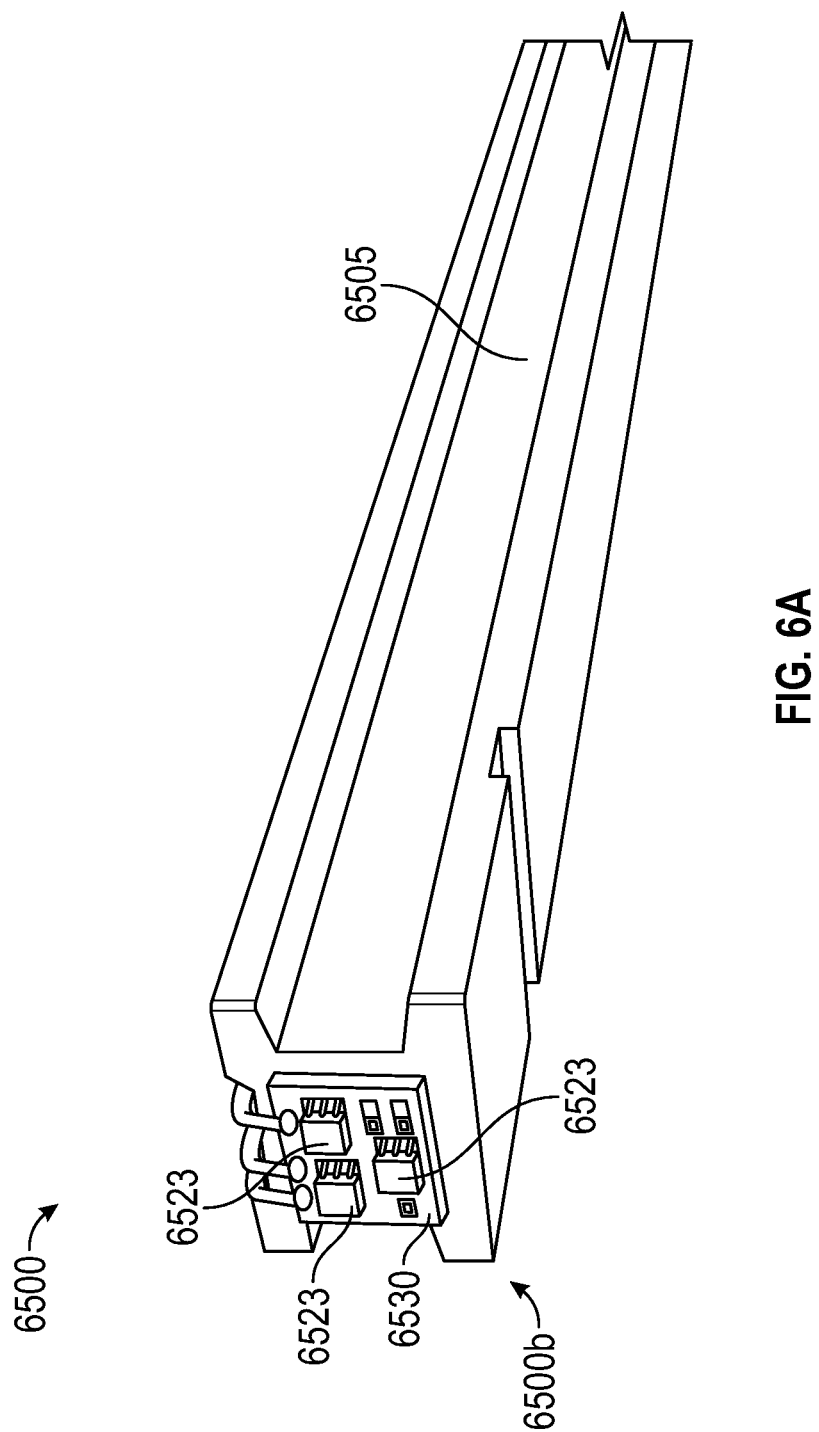

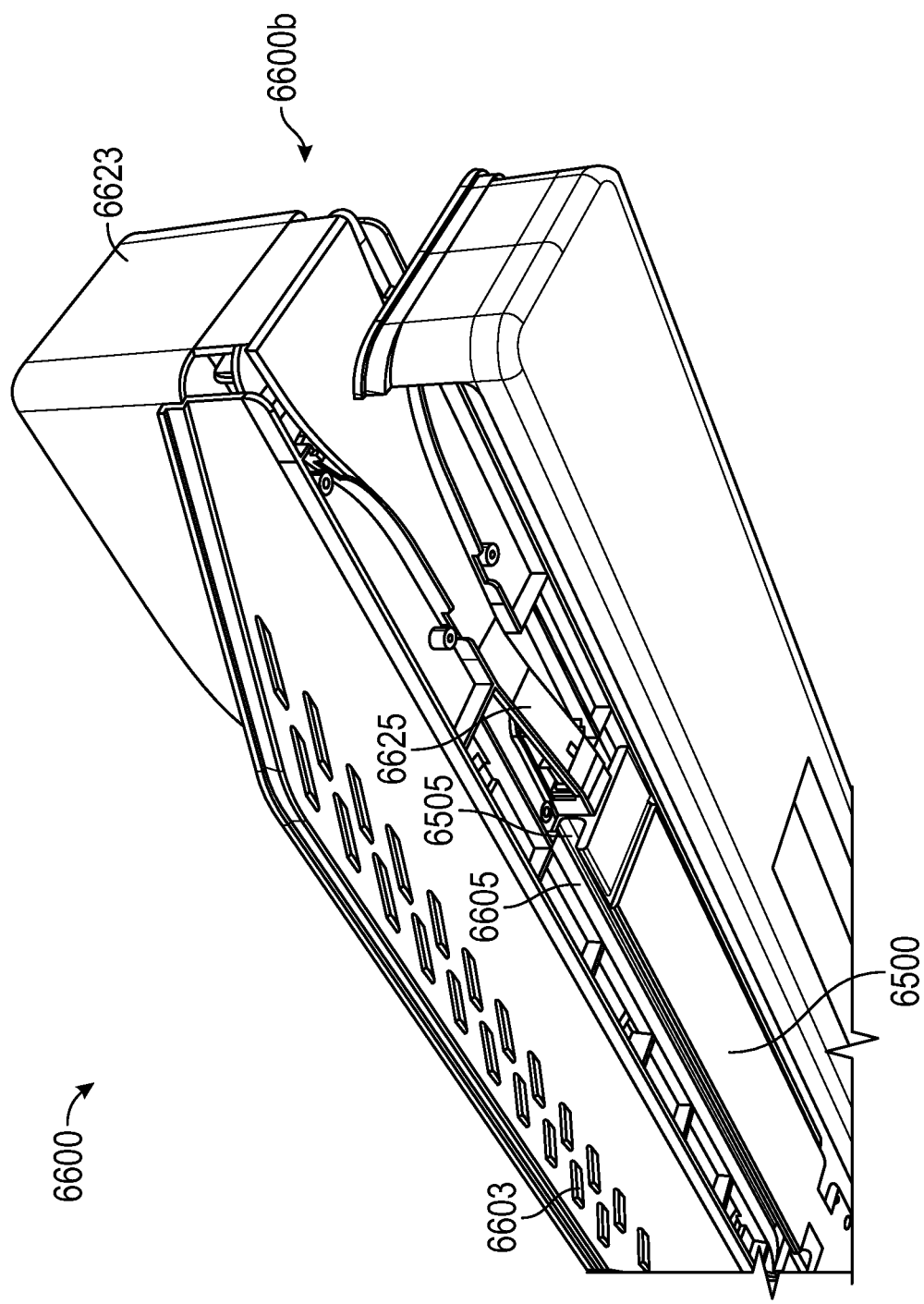

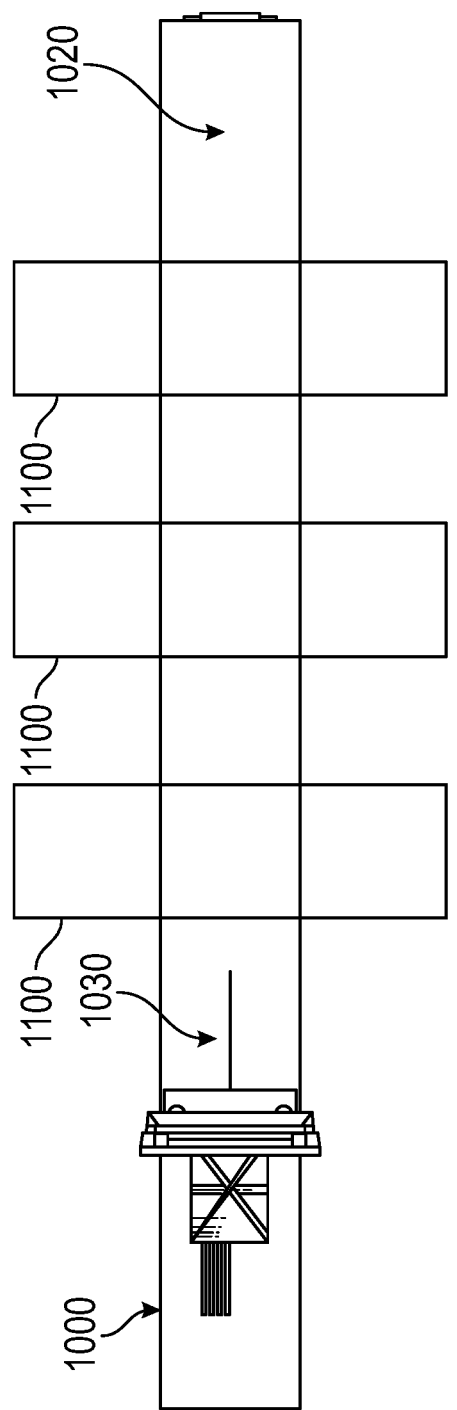

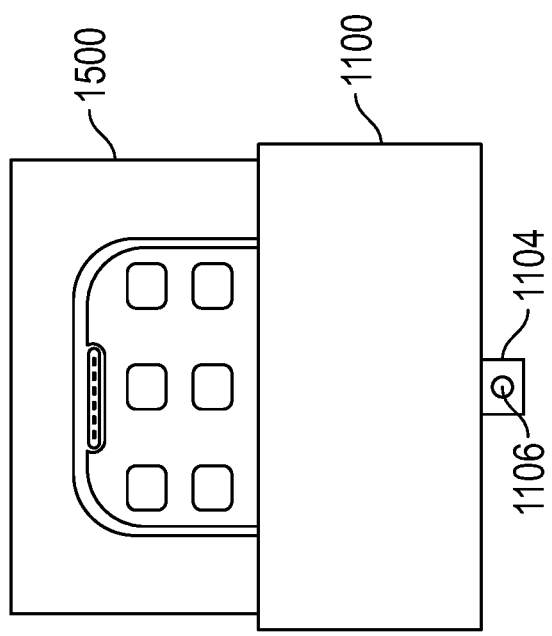

CANTILEVERED WEIGHT SENSITIVE SHELF, RAIL, AND MOUNTING SYSTEM

CROSS-REFERENCE TO RELATED APPLICATIONS

The present disclosure claims the benefit of and priority to U.S. Provisional Patent Application Ser. No. 62/454,552, filed on Feb. 3, 2017; U.S. Provisional Patent Application Ser. No. 62/536,811, filed on Jul. 25, 2017; and U.S. Provisional Patent Application Ser. No. 62/586,659, filed on Nov. 15, 2017, the entire contents of each of which are incorporated herein by reference. The present disclosure is also related to U.S. Provisional Patent Application Ser. No. 62/454,690, filed on Feb. 3, 2017; U.S. Provisional Patent Application Ser. No. 62/454,692, filed on Feb. 3, 2017; U.S. patent application Ser. No. 14/947,848, filed on Nov. 20, 2015; and International Patent Application Serial No. PCT/US2017/066190, filed on Dec. 13, 2017, which claims priority to U.S. Provisional Patent Application Ser. No. 62/433,464, filed on Dec. 13, 2016, the entire contents of each of which are incorporated herein by reference.

BACKGROUND

1. Technical Filed

The present disclosure is directed to systems and methods of use for weight sensing shelves for use in an automatic retail device.

2. Description of Related Art

Prior automatic retail devices and networked vending systems have been described in the following commonly-owned references: U.S. Pat. No. 8,191,779, entitled Wireless Management of Remote Vending Machines; U.S. Pat. No. 8,998,082, entitled Multimedia System and Methods for Controlling Vending Machines; U.S. Patent Application Publication No. 2015/0279147, entitled, Systems and Methods for Automated Dispensing Systems in Retail Locations, filed Mar. 31, 2015; and U.S. Patent Application Publication No. 2017/0148005, entitled Integrated Automatic Retail System and Method, filed Nov. 20, 2015. Each of these patents and U.S. Publications are incorporated herein by reference.

While each of these references addresses certain issues of the remote vending and automatic retail device industry, improvements are always desired.

SUMMARY

The present disclosure is directed to a rack assembly for use with an automatic retail device. The rack assembly includes a rack body comprising and a load bar configured to mount to the rack body. The rack body includes a fastening element configured to mount the rack body to a portion of the automatic retail device and a main shelf controller disposed within the rack body and in communication with a microcontroller of the automatic retail device. The load bar includes a weight sensor configured to sense a weight of products positioned on the load bar and a circuit board. The circuit board is disposed on the load bar and in electrical communication with the weight sensor and the main shelf controller. The circuit board transmits a signal corresponding to the weight sensed by the weight sensor to the microcontroller via the main shelf controller.

The fastening element of the rack body may be a hook disposed on a backside of the rack body. The hook is configured to hang the rack body on a back wall of the automatic retail device.

The load bar may include a second circuit board disposed on a distal portion of the load bar. The second circuit board is in electrical communication with the circuit board. The rack assembly may further include a vibration motor operably coupled to a portion of the load bar and in electrical communication with the circuit board. The vibration motor is configured to create a tactile vibratory or audible effect to the load bar. Additionally, or alternatively, the rack assembly may include a light emitter operably coupled to a portion of the load bar and in electrical communication with the circuit board. The light emitter is configured to create a visual effect to the load bar.

In one aspect, the rack assembly further includes a bin and the load bar defines a slot at least partially along its length configured to receive a portion of the bin therein. The bin may be releasably fixed to the load bar or may be slideable along the load bar. The load bar may include a light emitter and the bin may include an illuminating element configured to optically transmit light from the light emitter of the load bar. Additionally, or alternatively, the bin may include a spring loaded pusher positioned therein and configured to distally advance products positioned in the bin.

The rack assembly may further include a boot configured to securely adhere to a product. The boot includes a tab extending from its surface and the load bar includes a locking element configured to lock and unlock the boot to and from the load bar via the tab upon receiving a command from the circuit board.

The load bar may have an I-shaped cross-section with a top section and a bottom section separated by a middle section to define a slot between the top section and the bottom section extending along at least a partial length of the load bar. Alternatively, the load bar may have a T-shaped cross-section with a top section defining a slot extending along at least a partial length of the load bar.

In one aspect, the circuit board includes a pin arrangement extending therefrom and configured to align with a pin receiving arrangement of the rack body to create an electrical communication between the circuit board and the rack body when the load bar is mounted to the rack body without the use of any additional cable connections. Additionally, or alternatively, the rack body may further include a contact point PCBA configured to establish an electrical connection between the main shelf controller and a plurality of load bars coupled thereto.

BRIEF DESCRIPTION OF THE FIGURES

FIG. 1B is a view of an interior of the automatic retail device of FIG. 1;

FIG. 1C is a front view of the automatic retail device of FIG. 1 with a door thereof open;

FIG. 1D is a side view of the automatic retail device of FIG. 1 with a door thereof open;

FIG. 6A is a front perspective view of a load bar having a second PCB in accordance with another aspect of the present disclosure;

FIG. 6B is a front perspective view of a bin mounted to the load bar of FIG. 6A;

FIG. 9A is a top view of a plurality of boots releasably locked to a load bar in accordance with an aspect of the present disclosure;

FIG. 9B is a front view of a boot configured to lock to the load bar of FIG. 10A.

DETAILED DESCRIPTION

General Overview of Automatic Retail Device

Figure 1:
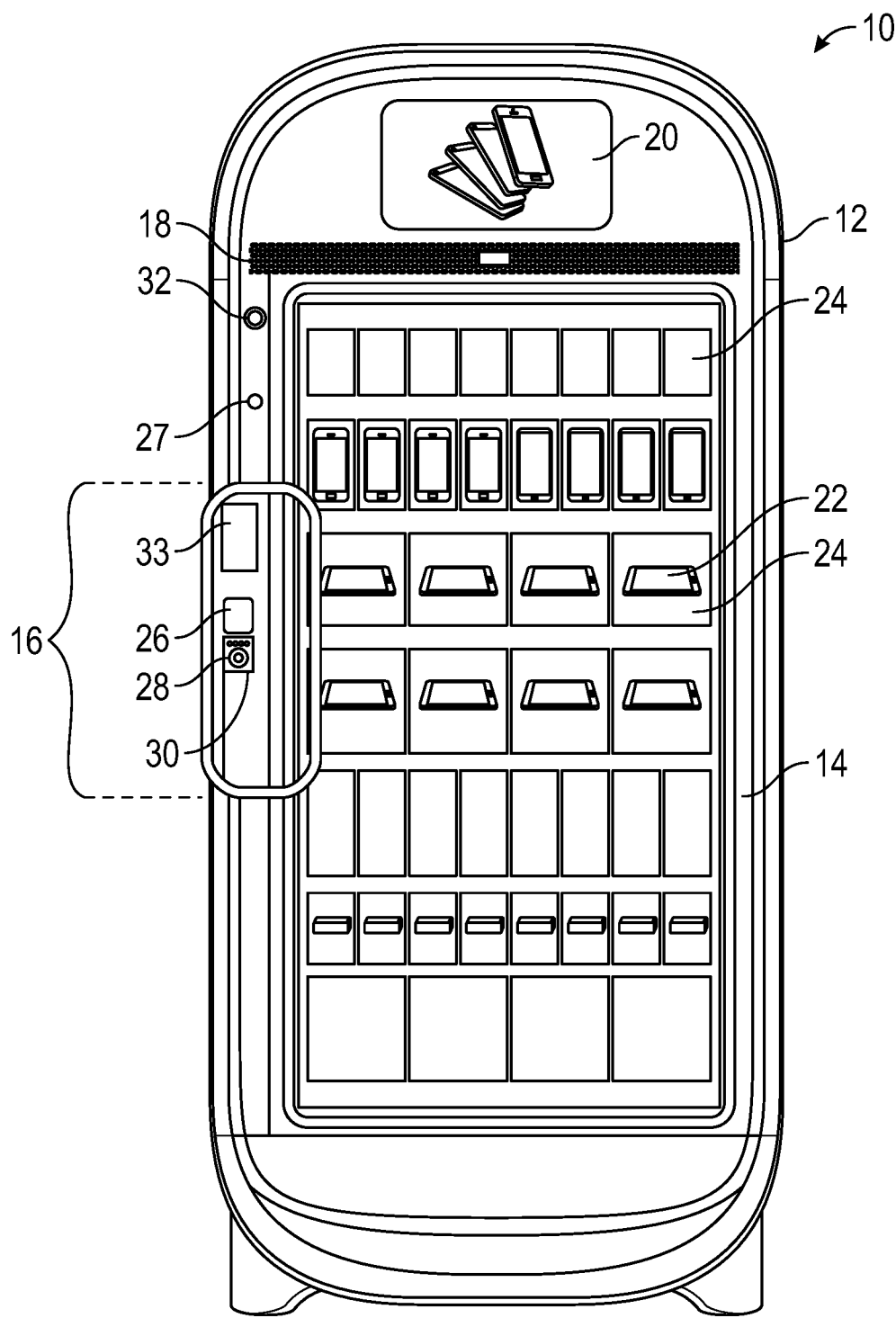
FIG. 1 is a front view of an automatic retail device in accordance with the present disclosure.
Figure 1A:
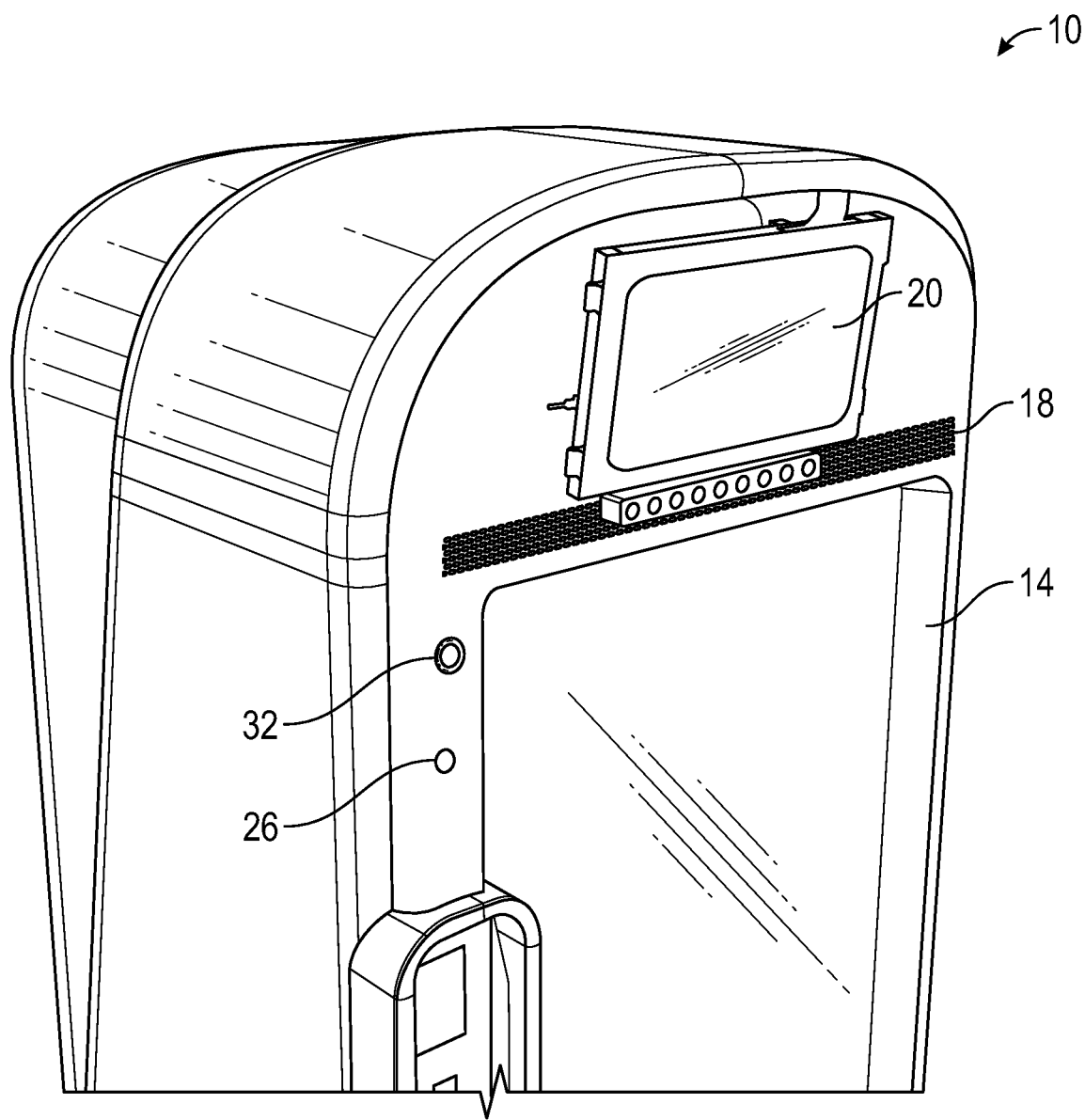
FIG. 1A is a front perspective view of a portion of the automatic retail device of FIG. 1.

FIG. 1 depicts an automatic retail device 10 in accordance with the present disclosure. The automatic retail device 10 includes an enclosure 12 having a door 14. The door 14 employs a locking mechanism 16 to limit access to the automatic retail device 10. The soundbar 18 outputs audible information to a user at the automatic retail device 10. The soundbar 18 also incorporates a speaker and a microphone which receives verbal communication from a user. A display 20 outputs visual information to a user at the automatic retail device 10. The door 14 preferably has a glass front 22 allowing a user to see all that is retained within the automatic retail device 10.

Figure 4:
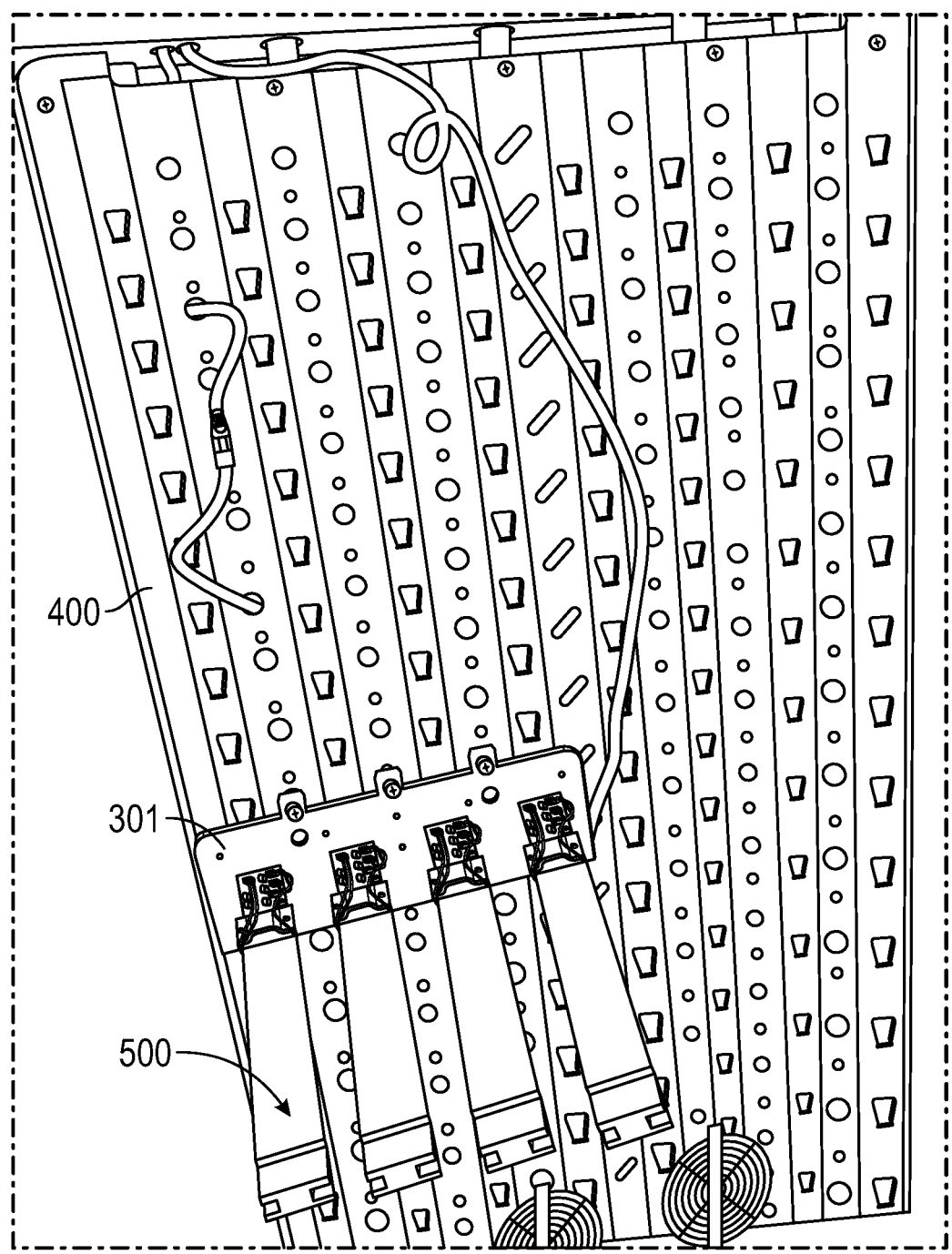
FIG. 4 is a front perspective view of an exemplary rack, with a plurality of load bars mounted thereto, mounted on a back panel of the automatic retail device of FIG. 1.

In this embodiment, the glass front 22 reveals what appear to be shelves including a variety of bins 24. As will be described in greater detail below, each bin 24 is mounted to a back wall 400 (FIG. 4) of the automatic retail device 10 via a load bar (not shown) and a rack assembly (not shown), and a wide variety of different sized bins 24 can be interchangeably employed depending on the articles to be vended. The bins 24 are configured to house, or otherwise support, different products ranging in a variety of different sizes and weights. Each bin 24, which is dimensioned to support a variety of products of different sizes and weights, is configured to either slide along a load bar or releasably lock to a load bar, as will be described in greater detail below.

In one aspect, each load bar of the automatic retail device 10 is configured to support a plurality of bins 24. In this configuration, each bin 24 can be associated with a single product positioned therein. Alternatively, in another aspect, each load bar of the automatic retail device 10 is configured to support a single bin 24, where the single bin 24 is associated with a plurality of products (or a single product) positioned therein.

Although referred to above as a "bin," the term "bin" may be referred to herein interchangeably with other terms such as "tray," "boot," and "rail," and may be substituted with any type of structure capable of supporting products thereto, thereon, or therein.

Use, Setup, and Architecture of Automatic Retail Device

The locking mechanism 16 of automatic retail device 10 may include a variety of features that can be interchangeably, or in combination, used to permit or limit access to the interior of the automatic retail device 10. For example, a biometric identifier (e.g., thumbprint reader) 26 may be incorporated into the locking mechanism 16. Alternatively or additionally, the biometric reader 26 may be an iris scanner. Further, a near field communication (NFC) reader 28 may be incorporated into the locking mechanism 16, which is used to communicate with another NFC enabled device (e.g., most smartphones operating applications such as APPLE PAY® or ANDROID PAY®). Additionally or alternatively, the NFC reader 28 may be an RFID reader and may be employed to detect the presence of an RFID tag. Still further, a card reader 30 may be utilized and permit access to the automatic retail device 10 only after swiping or reading of the chip on a credit card. Still further, a facial recognition camera 32 may be employed to detect a user as they approach the automatic retail device 10. Finally, a key pad 33 (either physical or a touch screen) to enable the inputting of pin codes or promotion codes and the like may further be coupled to and/or incorporated in the locking mechanism 16, as will be described in greater detail below. The keypad or touchscreen 33 may also be used to enable responses by the user (e.g., selection of an option, presentation of branding associated with a product or service, or it may flash to alert the user of its location).

With reference to FIGS. 1B-1D, one or more further cameras (e.g., camera 15) may be located on the interior of the automatic retail device 10. These interior cameras may be positioned on the interior of the door 14, on certain bins 24, or on load bars to enable filming/recording of user actions and user identification when retrieving items from the automatic retail device 10. These cameras 15 may be used to identify a user accessing the interior of the automatic retail device 10. Additionally, images and data acquired by the cameras 15 may be cross-referenced with the weight data acquired by weight sensors of the load bars to confirm that items have been removed from the load bars, and to associate a user with a weight change event. For further details regarding the automatic retail device 10, reference is made to International Patent Application No. PCT/US2017/066190, entitled "Methods and Utilities for Consumer Interaction with a Self Service System," filed Dec. 13, 2017, the entire contents of which are incorporated herein by reference.

The term "user" as used herein refers to any type of user of an automatic retail device 10, including purchasers, sellers, stockers, maintenance repair personnel, or any other type of user of such system, and such references are used interchangeably herein. Any of the inputs from a user or seller may be used to permit access to the goods and products kept within the automatic retail device 10 or to gain access to the shelving or bins 24 of the automatic retail device 10 to stock products therein. In order for a seller of products to access the automatic retail device 10 to stock their products therein, a seller may set up an account through an application (not shown) that can be downloaded to the user's smartphone or accessed through a web-based system using a computer, tablet, or other web-enabled device, as will be described in greater detail below. In summary, the seller inputs their information, including a credit card number, debit card number or other payment information in addition to financial information for which funds will be transferred upon completion of a sale. During this process, the seller may be requested to take a photo of themself, provide a thumb or finger print, submit a voice sample, or simply provide a pin number. Most smartphones include means for collecting images, finger or thumbprints, and voice samples, and can be configured to conduct an iris scan using the resident imaging capabilities. This information is collected and transmitted in encrypted form to servers that house the information for future use, as will be described in greater detail below.

Figure 2:
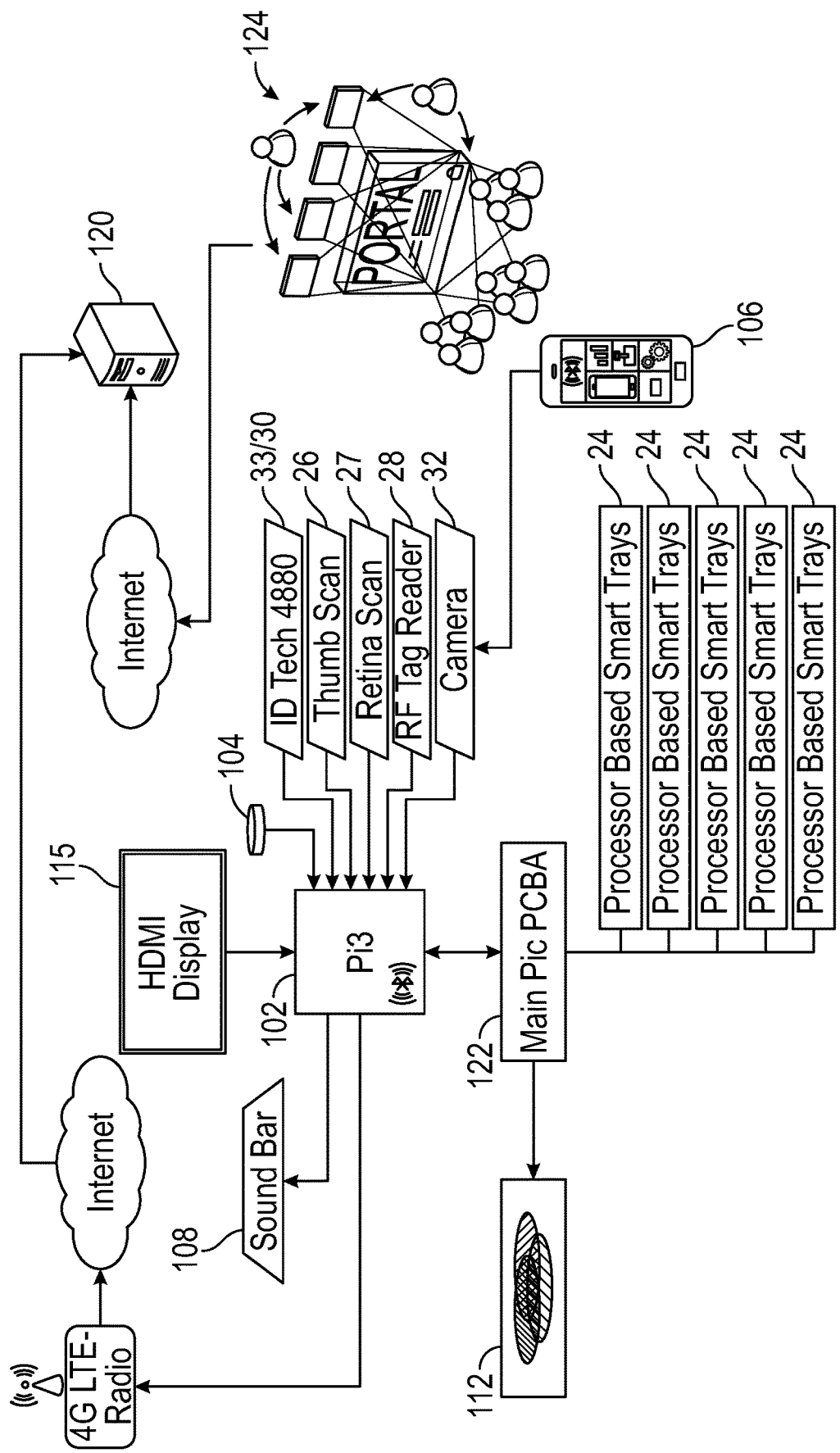
FIG. 2 is a system architecture diagram of an automatic retail system in accordance with the present disclosure.

The automatic retail device 10 may have an architecture as depicted in FIG. 2. The automatic retail device 10 includes a microcontroller 102 which receives input from a variety of the components described above, including a microphone 104, a card reader/touchscreen 30/33, a fingerprint scanner 26, a retina scanner 27, an RFID tag reader (e.g., a NFC device) 28, and/or a camera 32. A display screen 20 also receives input from the microcontroller 102. Still further, the microcontroller 102 may be enabled to receive communications directly from a smartphone 106 via, for example, BLUETOOTH® and other wireless communication protocols. The microcontroller 102 also provides outputs to the speakers 108, and to a wireless internet connection 110, such as 4G LTE or other cellular or wireless communications systems, to enable internet connectivity. The internet connectivity allows for communications over the internet for a variety of purposes, as described in greater detail below. The microcontroller 102 also controls the locking mechanism 16 of the automatic retail device 10.

The locking mechanism 16, and particularly the fingerprint scanner 26, NFC device 28, or card reader 33 can include a lighting mechanism whereby a light pipe or other light source projects backlighting onto a rear surface of these interfaces. This may be a red, green, blue (RGB-type) backlighting arrangement. This backlighting allows the user to request indication of which interface is for which type of payment and have the automatic retail device 10 light the appropriate one in response to the request.

The microcontroller 102 is primarily responsible for receiving inputs from a user and communicating with the system servers 120 to confirm the identity of the user, control stocking and inventory, and permit access to the automatic retail device 10. In connection with the confirmation of the identity of the user, a variety of protocols may be initiated. Upon receiving an input from a user to authorize access to the automatic retail device 10, the microcontroller 102 may signal the main controller 122 to survey the contents of the automatic retail device 10. This may be done by weighing each bin 24 of the automatic retail device 10. As noted above, these bins 24 can be installed in a variety of configurations to accommodate different items. Further, the main controller 122 and/or the microcontroller 102 may have access to a planogram outlining the contents of each bin 24 and the per-item weights of each item to be stocked in the automatic retail device 10. The planogram may be saved in memory associated with the main controller 122 and the microcontroller 102. As a result of this data, which is stored in a form accessible by the main controller 122 and the microcontroller 102, immediately before the unlocking of the door of the automatic retail device 10, a survey may be conducted to determine the contents of each individual bin 24 contained within the automatic retail device 10. While the contents of the survey of the automatic retail device 10 are being determined, the information provided by the user, e.g., the biometric data or RFID tag data or image, is transmitted to the servers 120 for confirmation of the user's identity. The servers 120 transmit a signal either confirming the user's identity and granting access or denying access to the automatic retail device 10. With the contents of the automatic retail device 10 confirmed, and the identity of the user confirmed, the microcontroller 102 can output a signal to the locking mechanism 16 to allow the door 14 to be opened.

As described briefly above, a user may create a user account using an application on their smartphone 106. Alternatively, the user may avail themselves of a client portal 124 via a web connected device and create an account granting the user access to the automatic retail device 10. The user interface allows the user to enter the necessary identifying information and provide the biometric samples (e.g., iris scan, photo, voice sample, thump print, etc.). In addition, the client portal 124 allows the user to check their account balances, alter payment arrangements, and challenge charges to their account.

As an alternative to, or in addition to, the application or the client portal 124, the user may go through an account set-up process at the automatic retail device 10. The interactions with the automatic retail device 10 may be supported by an artificial intelligence (AI) that is either resident on the automatic retail device 10 or in close communication via the internet connection 110 (e.g., on a server 120). An AI in its simplest form is a combination of computer programs that can receive different inputs and respond audibly, physically, or visually using the soundbar 18, the display 20, the lighting 112 and other features of the automatic retail device 10. In an aspect, the AI is primarily a translator from speech to text to data enabling the microcontroller 102 to analyze the data and formulate a response or to communicate further to the server 120 via the internet connection 110 to resolve the communication, receive a return of data from the server 120 and again translate that to a form the user can understand. That translation may be audible using the soundbar 18, it may be visual using the display 20, it may include lighting 112, and other forms of communication.

In the example of setting up an account at the automatic retail device 10, after inserting a credit card, the AI associated with the automatic retail device 10 walks the user through a series of questions and queries to set up the account. For example, having read the information on the credit card, the AI using the soundbar 18 may communicate directly with the user asking if they would like to set up an account. When the user says yes, the AI may ask that the user confirm their name, and provide some additional information to corroborate their identity. Once corroborated, the AI may request the user place their finger or eye on or near the biometric reader. The data related to user's biometrics are stored and will be forwarded to the servers 120 and databases that house the information of all the users. The AI may also take an image of the user and associate that image with the account. Still further, a voice sample may be recovered for comparison purposes in future transactions. This may take the form of a request for verbal confirmation that the user wishes to agree to the terms of use of the automatic retail device 10.

Once all the data is collected, anything removed by that user from the automatic retail device 10 will be charged to the user's credit card or otherwise reconciled as set out in the agreement with the automatic retail device 10 system. In one embodiment, none of the data regarding the user is saved locally on the automatic retail device 10, but rather is uploaded in an encrypted form to the servers 120 for access at later time. In effect, this action at the automatic retail device 10 is identical to the outcome achieved using either an application on a smartphone 117 to set up an account, or using the client portal 124.

In one aspect, the automatic retail device 10 may be configured to offer samples of products, where samples of items placed in bins can be removed from the bin without the user being charged for purchasing the product. In this respect, a user may sample an item before deciding to purchase the item. Samples of the products may be smaller in size, and lighter in weight, than the actual product. Thus, weights of the samples will be stored in the system and the system will distinguish between the removal of a sample or the full sized item. Additionally, in one aspect, the system may authorize the removal of a limited number of samples. In such a configuration, the system may charge a user's account if more than the authorized limited number of samples is removed from the automatic retail device 10.

Architecture and Control of Shelving

Figure 2A:
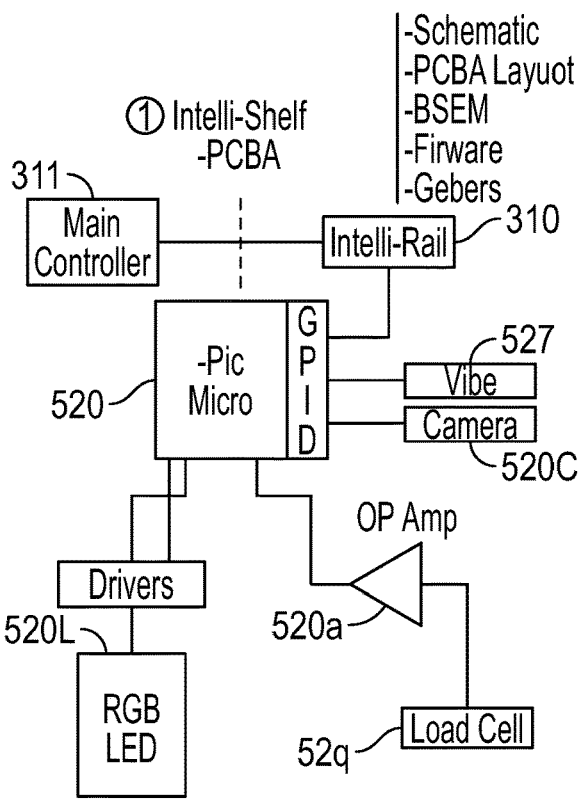
FIG. 2A is a system architecture diagram of a rack assembly of an automatic retail system in accordance with the present disclosure.

FIGS. 2A-2D depict four electronic subsystems for enabling the functionality of the present disclosure with respect to the various embodiments of rack assemblies, trays, bins, boots and load bars described below. Each of FIGS. 2A-2D, depicts the communication and signaling pathway from a main shelf controller 311 to various aspects and components of the automatic retail device 10, in particular, the main controller 122 and the microcontroller 102. In FIG. 2A, the main controller 122 of the automatic retail assembly 10 communicates with the rack assembly 300 via the rack assembly's main shelf controller 311. This may be via a communications bus which can facilitate the use of MAC addresses, making the system expandable to a large number of rack assemblies 300 and load bars 500, and increasing the speed of communications and processing.

The main shelf controller 311 communicates with a microcontroller located on the first printed circuit board 520 on the load bar 500 to receive data (such as weight) from the load bar 500 and to transmit signals to the load bar 500. As described in greater detail below, each main shelf controller 311 is coupled to multiple first PCBs 520 (of multiple load bars 500) via a contact point PCBA 310. The microcontroller of the first PCB 520, through its communication with the main shelf controller 311, drives lighting for each load bar 500 via LEDs 520L, controls the vibration drivers 527, and can operate a keyhole camera 520c located on an underside of a load bar 500 to enable viewing activities on the load bar 500 level below.

When the system desires to identify the location of an item to a user, whether a merchandiser stocking the shelves or a purchaser retrieving an item, the main controller 122 signals the main shelf controller 311 in the rack assembly 300, which passes appropriate signaling to the microcontroller on the first PCB 520 of the load bar 500 to either apply the appropriate lighting (e.g., illuminating a bin or tray containing the desired product or pulsing a light on a desired product) and/or vibrating the load bar 500 containing the product to bring its location to the attention of the user. This may be for the purpose of sale or for the purpose of restocking or a variety of other business purposes.

With respect to the load cell 529 (also referred to herein as a weight sensor or strain gauge), after allowing the door of the automatic retail device 10 to open, the main controller of the first PCB 520 waits for detection of a change in one of its load cells indicative of an item being removed from a specific shelf. The detected change causes strain gauges on the load cell to emit a signal. This signal is amplified via amplifier 520a and reported back to the main controller of the first PCB 520, which has logic (firmware) on its processor directing the reporting of that change to the main shelf controller 311 and ultimately to the main controller 122. In one example, upon detecting this change, and subsequently the closure and relocking of the door, the main controller 122 resolves the purchase of the item via a wireless link to a payment system to which the purchaser is a member. Membership is required to gain access to the automatic retail device 10 such that billing and payment information is known before access to the automatic retail device 10 is available.

Figure 2B:
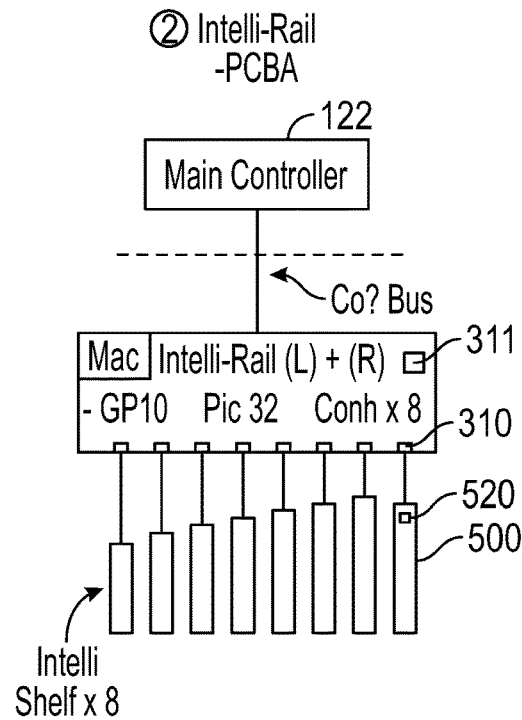
FIG. 2B is a system architecture diagram of a rack assembly in communication with a main controller of an automatic retail system in accordance with the present disclosure.

Moving to FIG. 2B, as described above, the rack assembly 300 includes a main shelf controller 311, which communicates with the main controller 122 over a communication bus using MAC addresses. That main shelf controller 311 has either an eight or sixteen general purpose input/output (GPIO) connection. Each GPIO location is capable of communicating with the weight sensitive shelf/load bar 500 via first PCB 520, and either requesting a report out from the shelf, or receiving a signal from the shelf (e.g., detection of a change of weight).

Figure 2C:
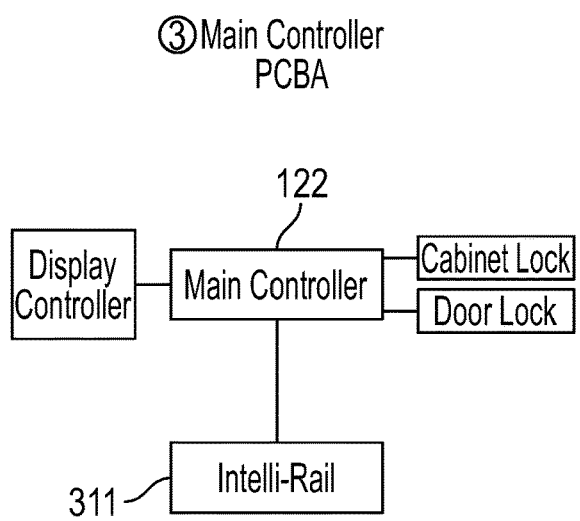
FIG. 2C is a system architecture diagram of a rack assembly in communication with a main controller of an automatic retail system in accordance with the present disclosure.

FIG. 2C depicts the aspects of main controller 122. As described above, the main controller 122 interfaces with the main shelf controller 311 of the rack assembly 300. The main controller 122 also interfaces directly with features such as the door lock and has more centralized control of the security features of the automatic retail device 10. Similarly, in instances where prescribed medicines are distributed via the automatic retail device 10, a separate cabinet lock (e.g., a locked bin) may be controlled by the main controller 122 to provide a second level of protection for these products. The main controller 122 also interfaces with the display controller. Though not shown here, the main controller 122 may also control general cabinet lighting directly.

Figure 2D:
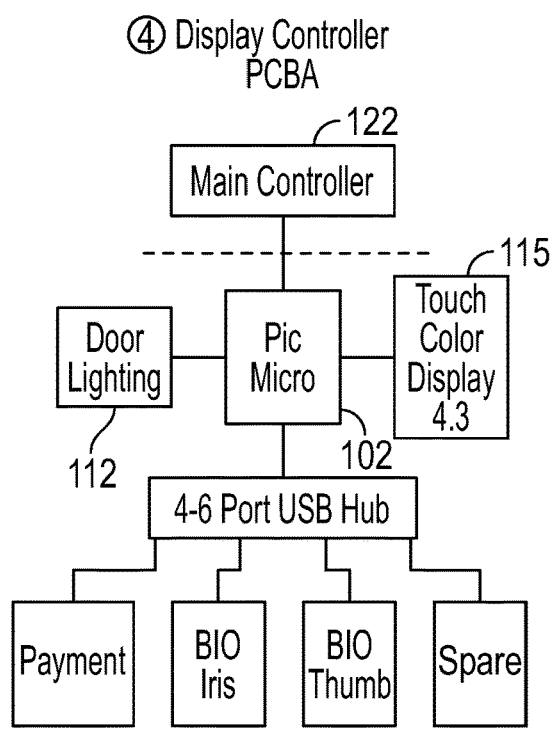
FIG. 2D is a system architecture diagram of a display controller of an automatic retail system in accordance with the present disclosure.

FIG. 2D illustrates a diagram of the front panel display controller. The automatic retail device 10 includes two displays, one on the front of the door and one mounted above the door. The controller depicted in FIG. 2D is the controller for the front panel display and other features found there. Again, the main controller 122 communicates with a microcontroller located proximate the front panel display. This microcontroller receives information from a number of input devices including a payment input (e.g., strip or chip reader for credit cards), an Iris biometric scanner, a thumb print reader, and others. The microcontroller may also send a receive communications to a touch sensitive display. It is via these mechanisms that access is granted to the automatic retail device 10.

Rack Assemblies and Load Bars

Although several different embodiments of rack assemblies and loads bars are described below, it is understood that any components or features of one embodiment may be incorporated into any of the other embodiments, even if not specifically described. For example, although some embodiments of load bars are described as being usable with a bin or boot, and others described as being usable with a tray, it is understood that all of the different embodiments of load bars may be used with (and may include the structure necessary to be used with) any of a bin, tray, or boot. Additionally, all of the control, communication, weight sensing, lighting, and vibration features described above with reference to FIGS. 2 and 2A-2D, and described below, (and the structural components required therefor such as circuit boards, processors, controller, sensors, and microcontrollers) are usable with, and are contemplated as being components of, any of the embodiments of load bars, assemblies, rack bodies, and/or shelving described herein, even if not specifically described with respect to that embodiment. Further, it is noted that the terms "rail," "shelf" "bar," and "rack" are used interchangeably herein.

Each rack assembly described below is configured to support one or more load bars thereon. Each load bar includes at least one printed circuit board with a controller or processor, which is configured to communicate with at least one processor or controller of the rack assembly to, in turn, be in communication with the other controllers and microprocessors of the automatic retail device 10. Additionally, each load bar includes weight sensing means such that a weight of the load to the load bar may be determined, lighting capabilities, and vibratory capabilities such that audible, tactile, or visual feedback may be generated to directed a user's attention to a specific load bar.

The rack assemblies described below are mounted to a back wall of the automatic retail device. In aspects, the combination of the components of the load bars and the combination of the components of the rack assemblies can be assembled without any tools. Additionally, the combination of the load bars to the rack assemblies may also be assembled without any tools. In at least one embodiment, each row of load bars is supported by two rail systems which are electronically connected and in communication. This separation of the rails allows for elimination of one half row for the stocking of a tall item on half a shelf width and two shorter items next to it, thus minimizing lost space in stocking items.

Additionally, the automatic retail device 10 of FIG. 1 can be configured to receive a variety of sizes, heights, and widths of products as necessary for the user. For example, the automatic retail device 10 may be arranged to have six rows of eight load bars, each being the same size (this size is referred to as the single size). Each load bar has its own load cell for weighing the contents stocked on the respective tray or bin. However, the present disclosure is not limited to load bars and trays or bins of the single size, and contemplates a variety of sizes including half-size (FIG. 6A), double, and four times single size (each of which may include more than one load cell). Each weight load bar is supported by a single load cell, though multiple load cells may also be used without departing from the scope of the disclosure. Further, the use of the half-size shelves coupled with products of relatively low height can enable a large number of different items to be stocked in a single automatic retail device 10. For example, in one embodiment up to fifteen rows of load bars, each row having eighteen shelves, results in the ability to stock two hundred and seventy different individual item types in a single automatic retail device 10. In contrast, the embodiment depicted in FIG. 1 permits the vending of forty eight individual items.

Each load cell may have different weight sensitivities for example 5 KG, 10 KG, 20 KG, up to 50 KG as appropriate for the desired products for stocking. The load bars have a variety of functionalities that may be employed to assist a user (whether it is a stocking person, purchaser, seller, etc.) in identifying a desired product.

Embodiment 1: Turning now to FIGS. 3A-3C, FIG. 4, and FIGS. 5A-5B, a rack assembly 300 includes a plurality of load bars 500 secured along a length of the rack body 301 and is configured to mount to a back wall 400 of the automatic retail device 10 (FIG. 1). The load bars 500 can be configured with rack body 301 in a variety of ways. Generally in groups of four, though for very narrow products, up to eight or more load bars 500 can be configured on a single shelf via a single rack body 301. An example of such a load bar can be found in FIG. 6A, where such a narrower load bar, in combination with a narrow bin, allows for the sale of relatively high dollar items such as lipstick and nail polish, two items that are a constant source of loss at many retailers. In one aspect, the automatic retail device 10 is configured to be two rack assemblies 300 wide, but, of course, other configurations are possible.

Figure 3A:
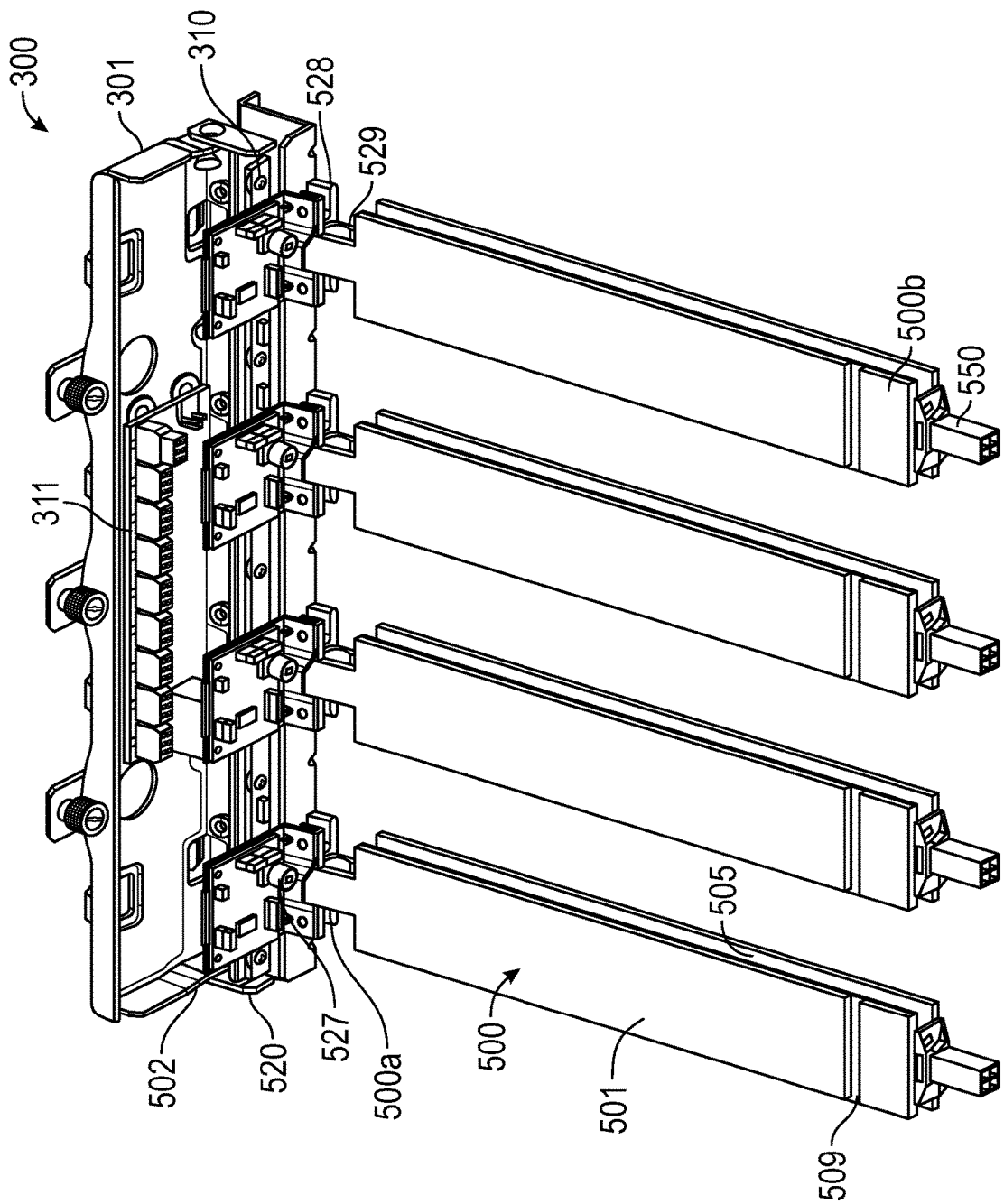
FIG. 3A is a partial front perspective view of an exemplary rack assembly with a plurality of I-shaped load bars mounted thereto, with a cover removed and not shown, for use with the automatic retail device of FIG. 1.
Figure 3B:
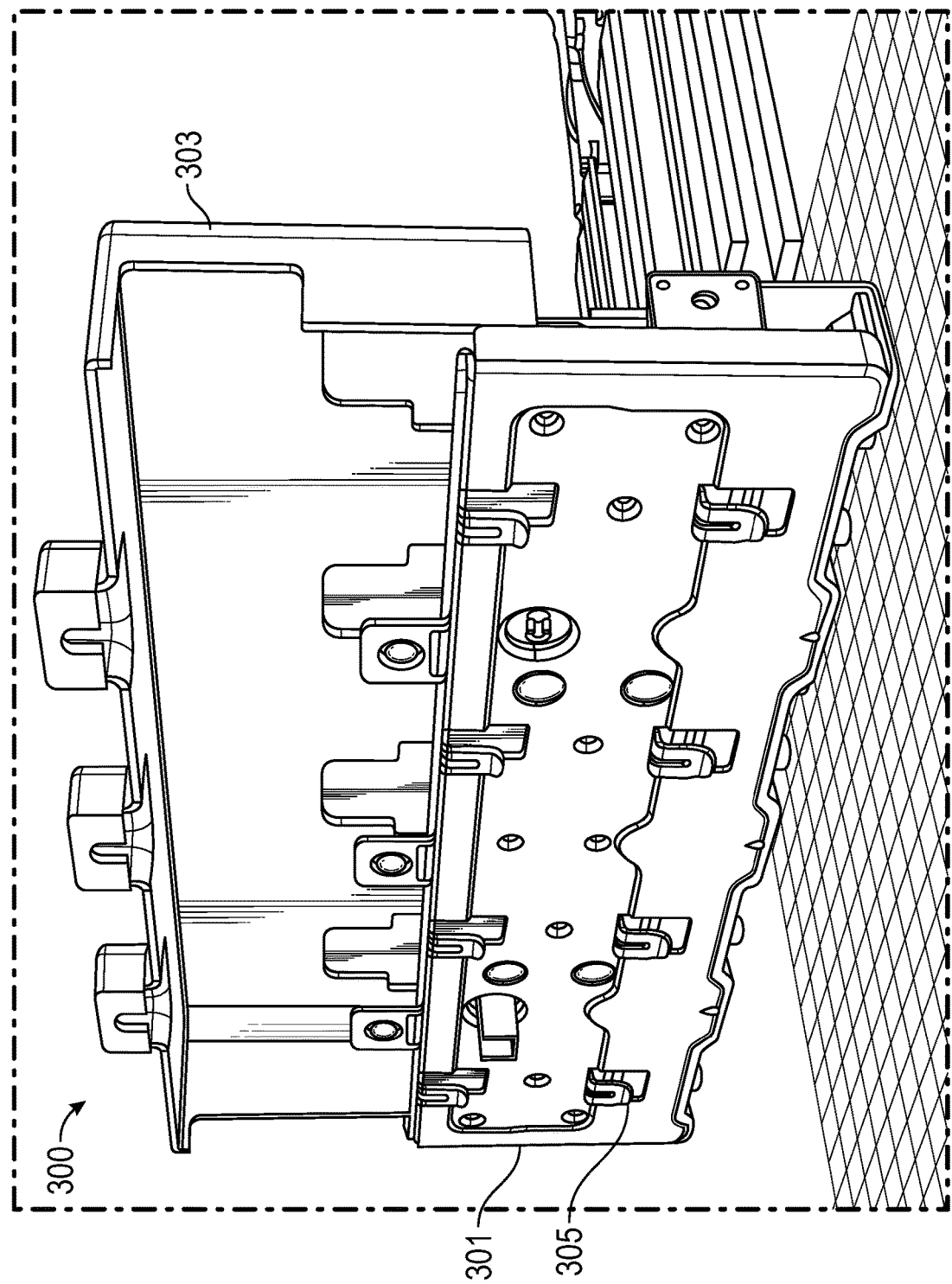
FIG. 3B is a partial rear perspective view of the rack assembly of FIG. 3A with a cover shown and removed.
Figure 3C:
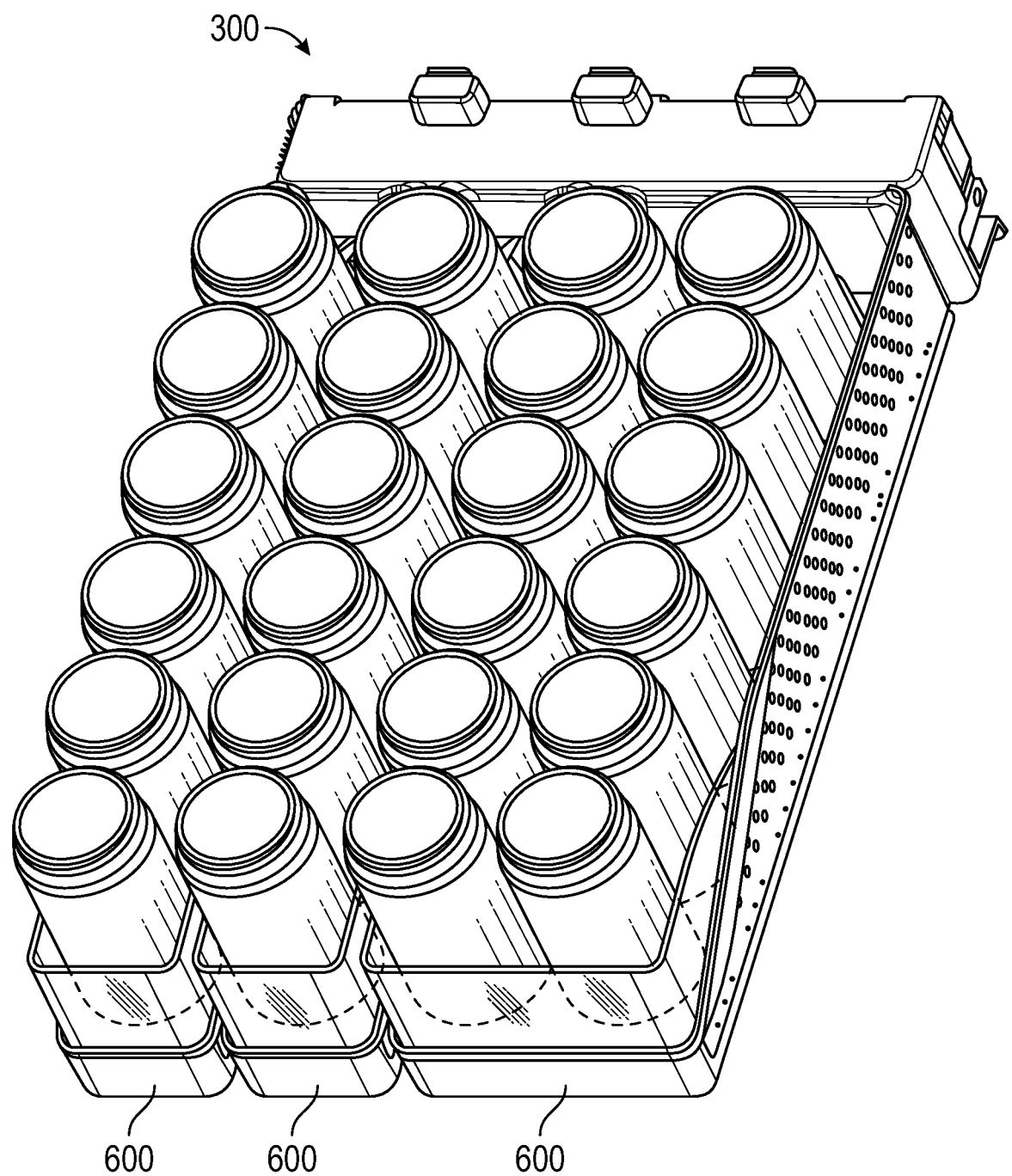
FIG. 3C is a front top perspective view of a rack assembly with a plurality of different sized bins coupled thereto.

Each load bar 500 of the rack assembly 300 is configured to support one or more bins 600 thereto. Alternatively, multiple load boars 500 may be configured to support a single bin 600, for example, for larger sized bins 600. For example, with brief reference to FIG. 3C, shown is an example of a rack assembly 300 including three bins 600 mounted thereto, with one bin 600 being of a different size than the other two bins 600.

The rack assembly 300 includes a cover 303 having openings or slots and shaped to cover the rack body 301 when the load bars 500 are secured to the rack body 301. The back of rack body 301 includes a plurality of fastening elements 305, shown as hooks in FIG. 3B, which are configured to engage with receiving fastening elements 405, shown as slots, of the back wall 400 to secure the rack assembly 300 to the back wall 400.

The load bar 500 is formed of an extruded, machined, built up (or a combination of such techniques to form a) generally I-shape. Though an I-shape is used for the present examples, other shapes may be used without departing from the scope of the present disclosure. The proximal portion 500a of load bar 500 includes a bracket 502 which is configured to securely fasten to a front portion of the rack body 301. The top surface 501 and the bottom surface 503 of the load bar 500 are generally flat and are separated by a mid-section dimensioned to form slots 505 on each side of the load bar 500. Slots 505 extend substantially the length of the load bar 500.

Enclosed within the rack body 301 are a main shelf controller 311 and a contact point PCBA 310, which is in communication with the main controller 122 of the automatic retail device 10. In one aspect, one rack assembly 300 includes a single main shelf controller 311 and a single contact point PCBA 310, but it is possible to use any number of controllers and PCBAs. Each load bar 500 includes a first PCB 520 which is in electrical communication with the contact point PCBA 310 (either directly via contact pins or via a separate wired connection), which in turn is in communication with the main shelf controller 311, which is in turn in communication with the main controller 122 of the system. In particular, a first printed board circuit PCB 520 is mounted to a bracket 502 of the load bar 500. The load bars 500 can sense changes in weight when items are added or removed from the load bars 500. The first printed circuit board 520 associated with the load bars 500 are used to convert the signal generated by the incorporated load cell 529 of the load bar 500, to a signal that can be processed by a microcontroller 122 in the automatic retail device 10.

In an aspect, load bar 500 may additionally include vibrating motor 527 coupled to the first PCB 520 to impart vibration against the load bar 500 to provide audible and tactile information to a user of an automatic retail device 10 in which the load bar 500 is placed.

Each load bar 500 includes two interconnected removes 528. These removes 528 extend through the width of the base of the load bar 500. Mounted on the load bar 500, directly in line with the removes 528 is a strain gauge 529. The strain gauge 529 detects tension and compression of the load bar 500 and particularly proximate the removes 528. Since the area of the load bar 500 proximate the removes 528 has the least amount of material, any load applied to the load bar 500 will affect that area first, placing it in either compression or tension, or changing the sensed compression or tension. Accordingly, the output of the strain gauge 529 provides data regarding the load applied to the load bar 500. As described above, the strain gauge 529 is in communication with the first PCB 520 and in turn, the contact point PCBA 310 and main shelf controller 311 (where applicable), and ultimately the main controller 122 and the microcontroller 102 of the system.

Figure 5A:
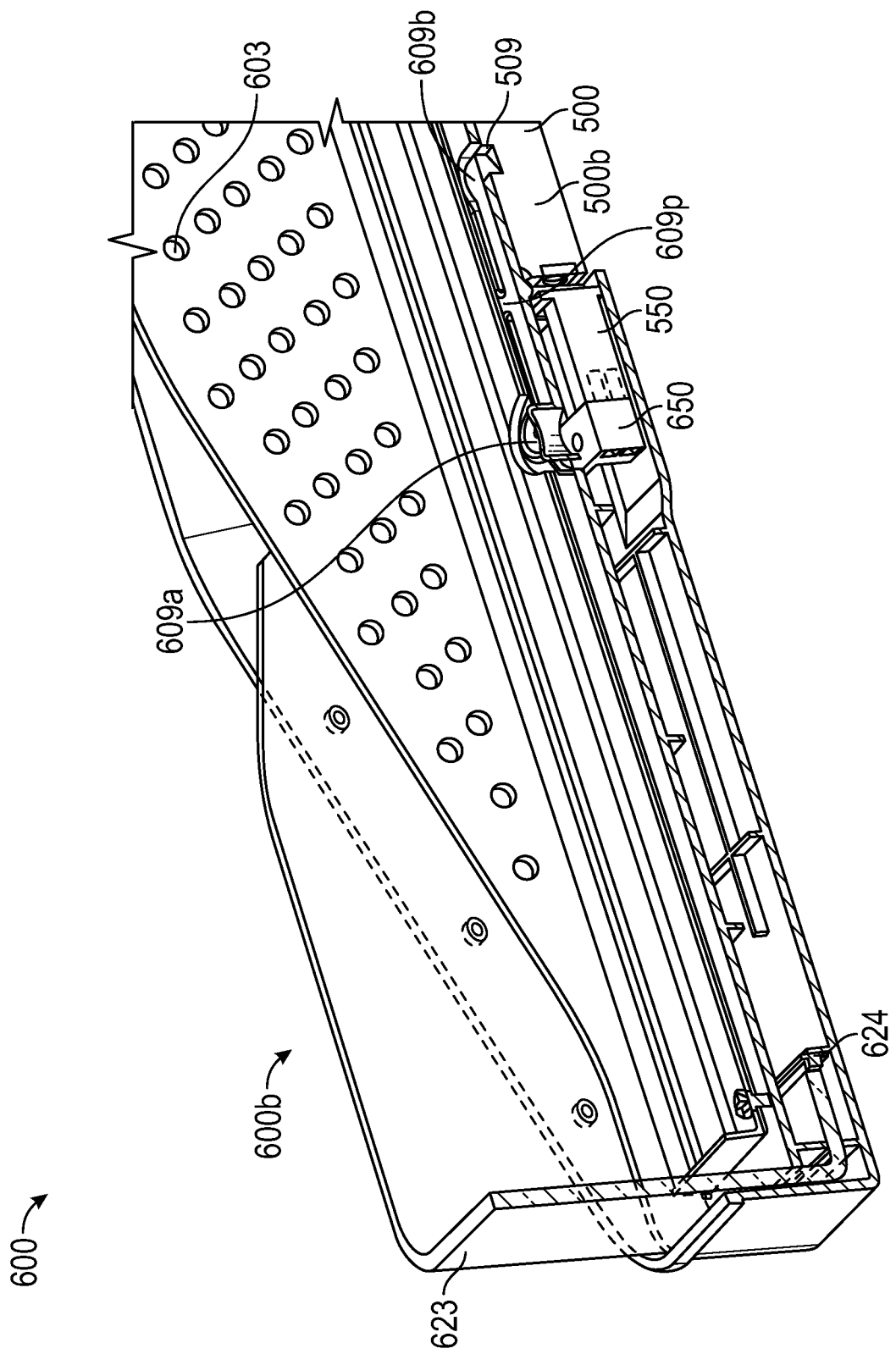
FIG. 5A is a side, perspective, cross-sectional view of a bin configured to mount to a load bar.
Figure 5B:
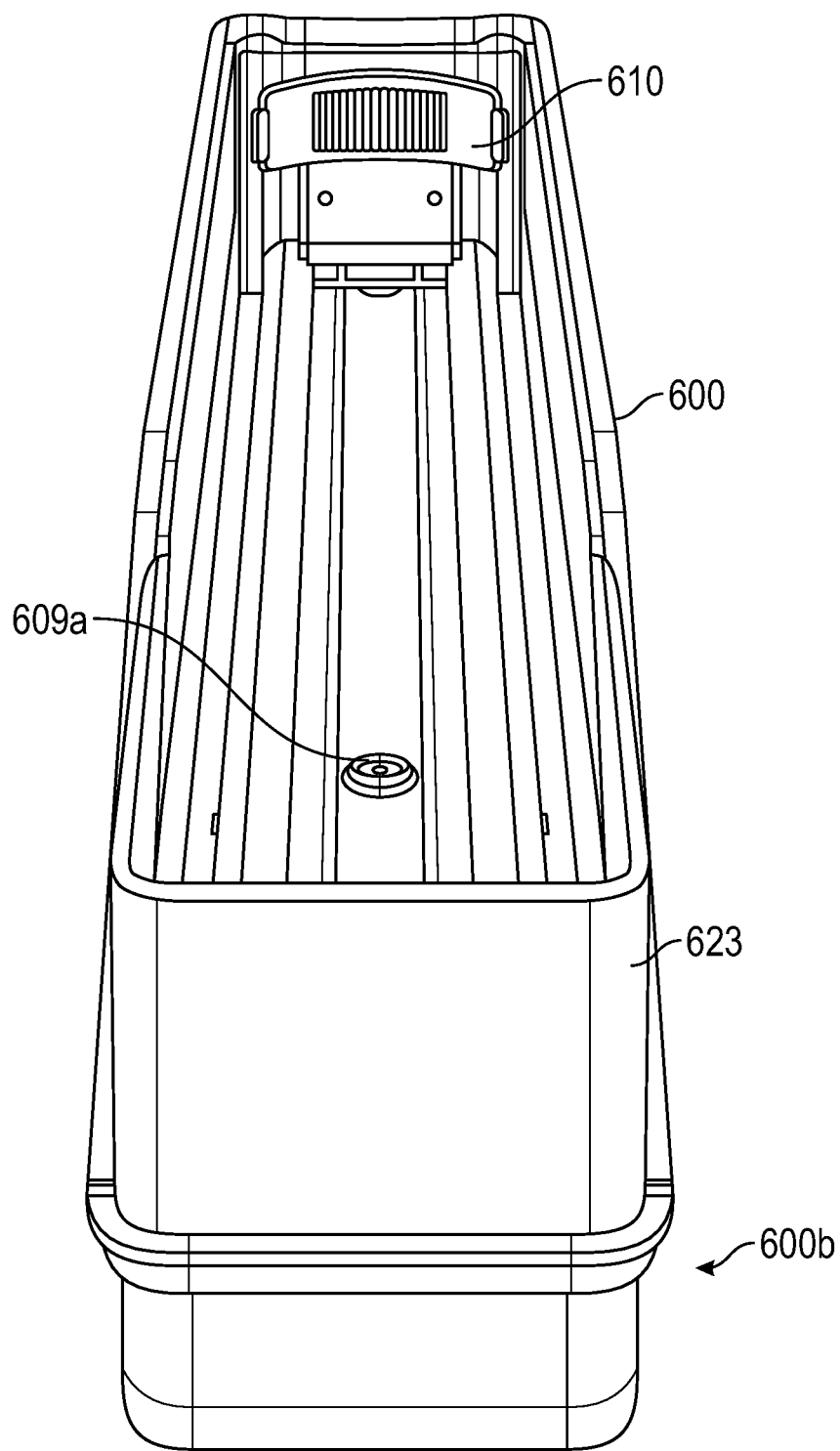
FIG. 5B is a top front perspective view of a bin configured to mount to a load bar.

With particular reference to FIG. 5A, the bin 600 may be slideably coupled to the load bar 500 in a drawer-type manner, and in some desired applications be locked thereto and non-movable. Bin 600 includes a track defining two inwardly facing flanges 605 configured to slide along respective slots 505 of load bar 500. A proximal portion of the track may be outwardly-tapered to a larger size opening, to promote ease of connection of the bin 600 to the load bar 500. In one aspect, the bin 600 may be latched to the load bar 500 to prevent its removal therefrom via a latching mechanism. In particular, a notch 509 in the load bar 500 mates with a releasable locking mechanism 609*a* in the bin 600 that secures the bin 600 to the load bar 500. The latching mechanism 609*a* may be included in the bin 600 and can be accessed from the top of the bin 600. Depression of one end of the latching mechanism 609*a* lifts the latch engager 609*b* at the opposite end out of a retention mechanism or slot (e.g., notch 509) machined into the load bar 500 by pivoting about pivot point 609*p*.

In the particular embodiment shown in FIG. 5A, load bar 500 additionally includes a connector 550 which is coupled to the first PCB 520 via leads running along the length of the load bar 500. Connector 550 may be disposed on the distal portion 500*b* of the load bar 500 and is configured to connect to a corresponding connector 650 of a bin 600 to provide electrical power and communication signals to light emitting diodes 624 of a bin 600 when the bin 600 is mounted to the load bar 500. In particular, a distal portion 600*b* of the bin 600 includes an illuminating element 623, for example a lens, mounted thereon. The illuminating element 623 is formed of an acrylic material, or any other material capable of transmitting light therethrough, and is optically coupled to light emitting diodes 624 of the bin 600 that are in electrical communication with the first PCB 520 of the load bar 500. In this manner, illuminating element 623 is illuminated when light emitting diodes 624 are illuminated. These lights may strobe, or be associated with etching or other manner of presenting a lighted display. This may include lighting a logo, or other indicators of the goods, or merely signal to the user where to look for goods they have selected or may be interested in or for which some offer is being made.

The sides of the bin 600 may include openings 603 defined therethrough to provide ventilation for controlling the moisture level of the storage area defined by the bin 600. The bin 600 may be formed of a two-piece construction, having a top half portion and a bottom half portion. The bottom half portion may serve to cover portions of the illuminating element 623 which prevents light from escaping from the illuminating element 623 except at the desired portions of the illuminating element 623, which are left exposed.

Figure 5C:
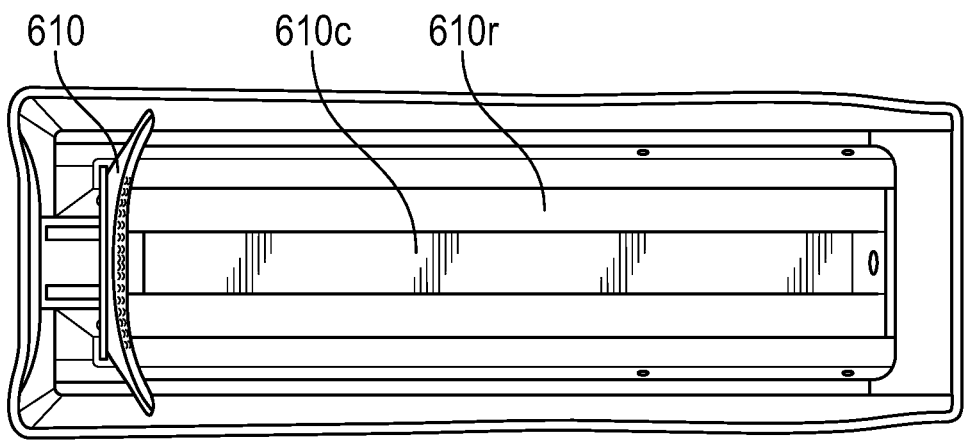
FIG. 5C is a top view of a bin showing a pusher plate in its back-most position.
Figure 5D:
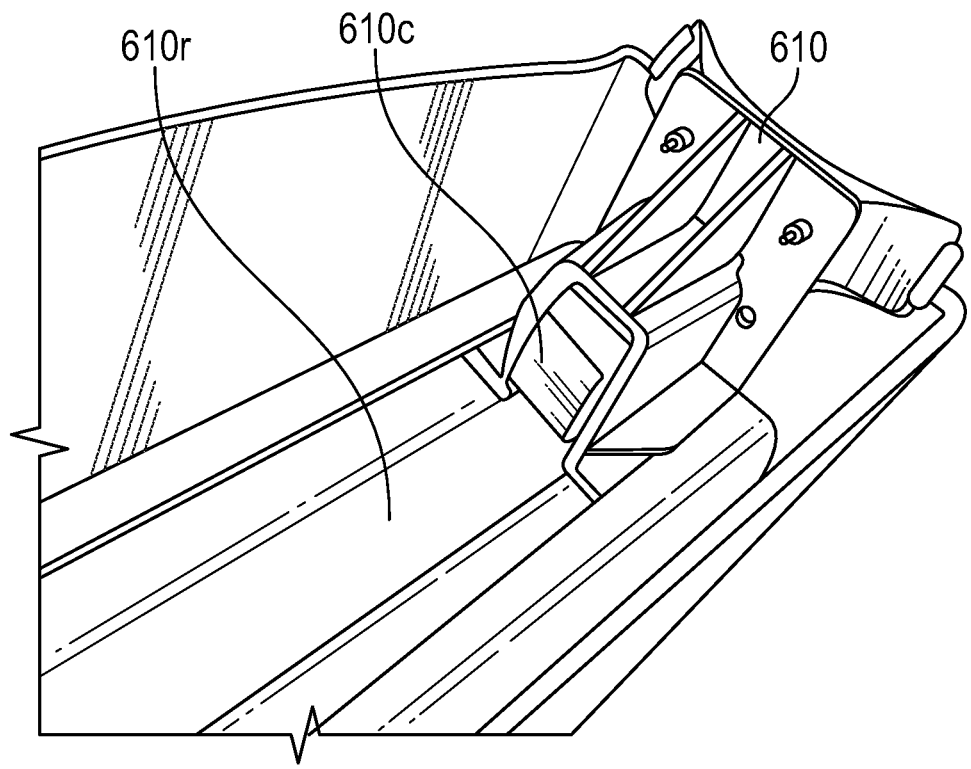
FIG. 5D is a rear perspective view of a bin showing a pusher plate in its front-most position.

Any of the bins or trays described herein, including bin 600 may include one or more pusher plates 610 that are spring loaded and used to advance products placed therein towards the front of the bin 600. The pusher plate 610 may have a standard size for all types of bins 600 by including means for attaching higher and wider plates thereto for movement of larger items. These may be removably added depending on the items to be positioned in the bin 600. The pusher plate 610 is spring loaded, and may have variable spring force such that a constant amount of pressure is applied to the front most item in the bin 600 and that constant force is applied when moving an item forward in the bin 600. This can be accomplished by different annealing of the coil spring 610*c*. The coil spring (not shown) may run in a recess 610*r* defined by the bin 600 and running along its length. The different annealing changes the mechanical properties and thus the spring forces along the coil spring 610*c*. In the fully outstretched condition (FIG. 5C), the coil spring 610*c* is generally flat and straightened, and the pusher plate 610 is toward the back of the bin 600. As pushing forward, the coil spring 610*s* coils unto itself within a portion of the housing of the pusher plate 610 (FIG. 5D).

Embodiment 2: Another embodiment of a load bar 6500 is shown in FIG. 6A which is configured to be used with the bin 6600 shown in FIG. 6B and mount to the rack body 301 of rack assembly 301. Load bar 6500 and bin 6600 are similar to load bar 500 and bin 600 and will not be described in detail for brevity. However, unlike the previously described load bar embodiments (i.e., load bar 500), load bar 6500 does not include a connector 550 and instead includes a second PCB 6530 with light emitting diodes. Additionally, unlike the previously described bin embodiments (i.e., bin 600), bin 6600 does not include a connector 650 or light emitting diodes 624. Second PCB 6530 includes light emitting diodes 6523 and is powered by electrical leads (not shown) extending the length of the load 6500 to a first PCB (similar to first PCB 520).

A distal portion 6600*b* of the bin 6600 includes an illuminating element 6623, for example a lens, mounted thereon. The illuminating element 6623 is formed of an acrylic material, or any other material capable of transmitting light therethrough, and is optically coupled to light emitting diodes 6523 of the second PCB 6530 of the load bar 6500 via a light pipe 6625. Light pipe 6625 may be a fiber optic component, waveguide, or any type of structure capable of transmitting light therethrough. In this manner, illuminating element 6623 is illuminated when light emitting diodes 6523 are illuminated. In one aspect, the light emitting diodes 6523 are positioned such that they interact with additional light pipes formed in the bin 6600 (not shown) and allow for the transmission of light though the bin 6600 to surfaces of the bin 6600 (for example, illuminating element 6623) which are visible to the user of the automatic retail device 10. These lights may strobe, or be associated with etching or other manner of presenting a lighted display. This may include lighting a logo, or other indicators of the goods, or merely signal to the user where to look for goods they have selected or may be interested in or for which some offer is being made.

The sides of the bin 6600 may include openings 6603 defined therethrough to provide ventilation for controlling the moisture level of the storage area defined by the bin 6600. As shown in FIG. 6B, the bin 6600 may be formed of a two-piece construction, having a top half portion and a bottom half portion. The bottom half portion may serve to cover the light pipe 6625 which helps to hold the light pipe 6625 in place and prevents light from escaping from the light pipe 6625 except at the desired portions of the light pipe 6625, which are left exposed.

With particular reference to FIG. 6B, the bin 6600 may be slideably coupled to the load bar 6500 in a drawer-type manner, and in some desired applications be locked and non-movable thereto. In particular, bin 6600 includes a track defining two inwardly facing flanges 6605 configured to slide along respective slots 6505 of load bar 6500. A proximal portion of the track may be outwardly-tapered to a larger size opening, to promote ease of connection of the bin 6600 to the load bar 6500. As with bin 600 and load bar 500, bin 6600 may also include a similar latching mechanism as latching mechanism 609*a*.

Additionally, load bar 6500 in FIG. 6A, may have a narrower width than that of load bar 500. Such a relatively narrow width, in combination with a bin having a narrow width, allows for the sale of relatively high dollar items such as lipstick and nail polish, two items that are a constant source of loss at many retailers. Using a narrower width load bar, such as load bar 6500, enables more load bars to assemble to rack assembly 300, thereby enabling more bins to be used in the automatic retail device 10, where applicable.

Embodiment 3: Turning now to FIGS. 7A-7G, yet another embodiment of a load bar is shown as a T-shaped load bar 710. The load bar 710 is formed of an extruded, machined, built up or a combination of such techniques to form a generally T-shape. Though a T-shape is used for the present examples, other shapes may be used without departing from the scope of the present disclosure. The top surface 712 is generally flat and incudes two ears 714 formed at the edges of the top surface 712. Inboard of the ears 714 are slots 716 which extend substantially the length of the load bar 710. The T-shaped cross-section of load bar 710 provides for a more secure connection to a rail system such as the rail body 301 of rail assembly 300.

As described above with respect to the other load bar embodiments, each load bar 710 includes a first PCB 722 which is in electrical communication with the contact point PCBA 310, which in turn is in communication with the main shelf controller 311, which is in turn in communication with the main controller 122 of the system. In particular, a first printed board circuit PCB 722 is mounted to a bracket 724 of the load bar 710. The load bars 710 can sense changes in weight when items are added or removed from the load bars 710. The first printed circuit board 722 associated with the load bars 710 are used to convert the signal generated by the incorporated load cell 728 of the load bar 710, to a signal that can be processed by a microcontroller 122 in the automatic retail device 10.

The load bar 710 includes two interconnected removes 728. These removes 728 extend through the width of the base of the T-shaped load bar 710. Mounted on the load bar 710, directly in line with the removes 728 is a strain gauge 730. The strain gauge 730 detects tension and compression of the load bar 710 and particularly proximate the removes 730. Since the area of the load bar 710 proximate the removes has the least amount of material, any load applied to the load bar 710 will affect that area first, placing it in either compression or tension, or changing the sensed compression or tension. Accordingly, the output of the strain gauge 730 provides data regarding the load applied to the load bar 710.

The load bar 710 possesses a large enough size and great enough mass which allows for receipt of a bin (not shown) which extends beyond the length of the load bar 710. The reduction in the number of components, and the elimination of the need of assembly, provides for a robust design.

The load bar 710 is configured to receive and support a bin (similar to bins 600 and 6600 previously described). The bin includes channels formed on an underside thereof which mate with the ears 714 of load bar 710 to secure the bin to the load bar 710. A slot 732 in the bracket 724 receives a tongue formed on the bin to further align the bin with the load bar 710. A locking hole 734 formed on the end of the load bar 710 may receive a locking pin through the tray or bin. The combination of the channels and ears, tongue and slot, and locking pin ensure that the bin, once positioned on the load bar 710, is securely held and will not fall off the load bar 710 or misalign without substantial, and out of the ordinary use of force being applied to the load bar 710. It can be appreciated that the strain gauge 730 could detect such an out of the ordinary force, and a parameter set in the software of the automatic retail device 10 may signal an alarm or, in extreme cases, prevent further operation of the automatic retail device 10 when such an out of the ordinary force is detected. Additionally, the load bar 710 may include a second PCB 718, similar to second PCB 6530 of load bar 6500, or alternatively may include a connector (not shown) similar to connector 550 of load bar 500 to perform the same function when connected with a bin having a receiving connector.

Figure 7A:
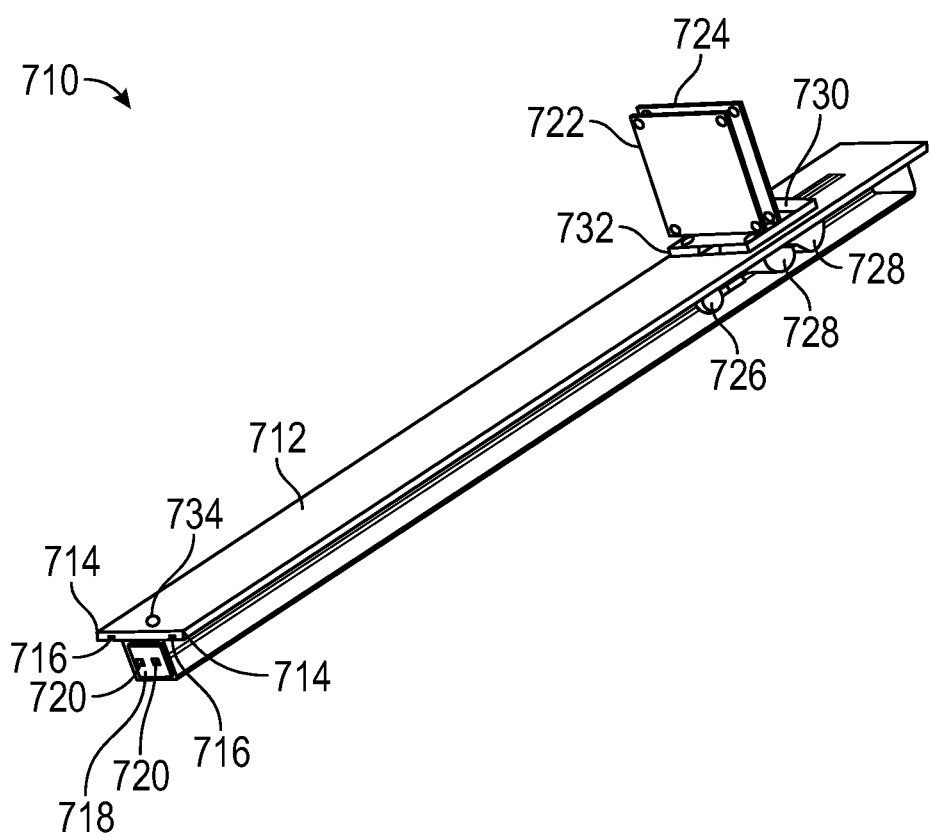
FIG. 7A is a front perspective view of T-shaped load bar in accordance with another aspect of the present disclosure.
Figure 7B:
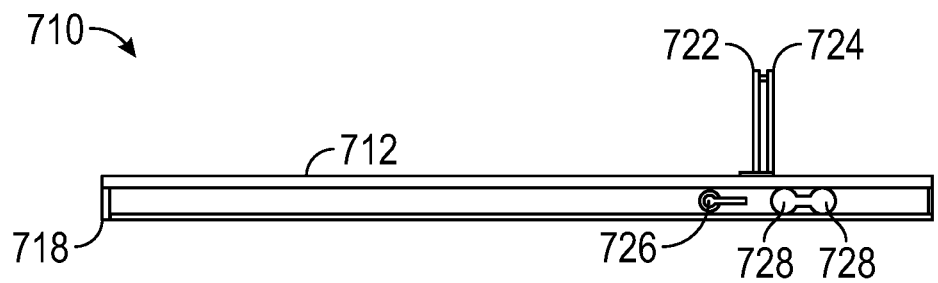
FIG. 7B is a side view of the load bar of FIG. 7A.
Figure 7C:
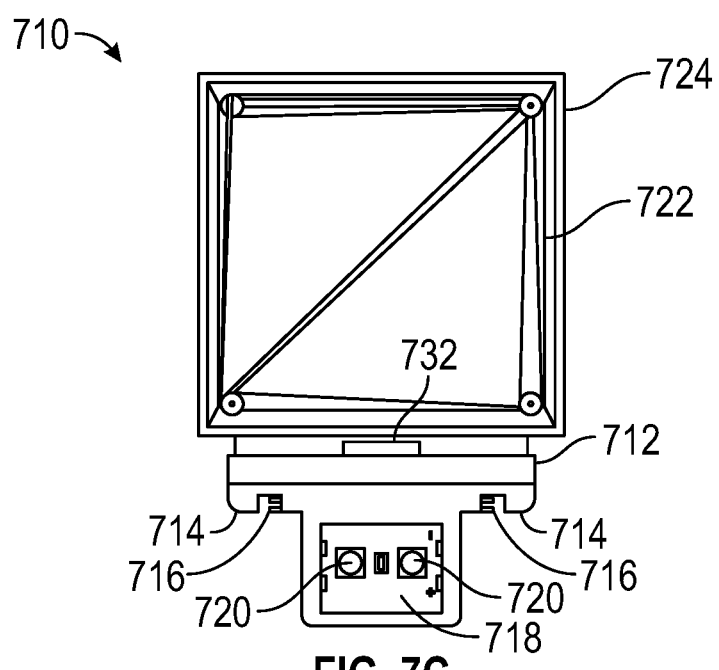
FIG. 7C is a front view of the load bar of FIG. 7A.
Figure 7D:
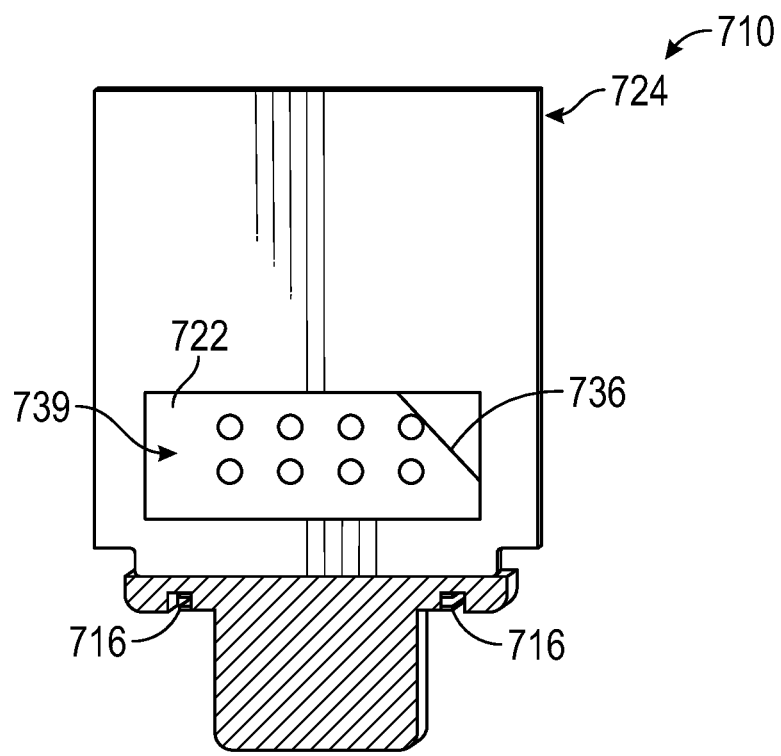
FIG. 7D is a rear view of the load bar of FIG. 7A.
Figure 7E:
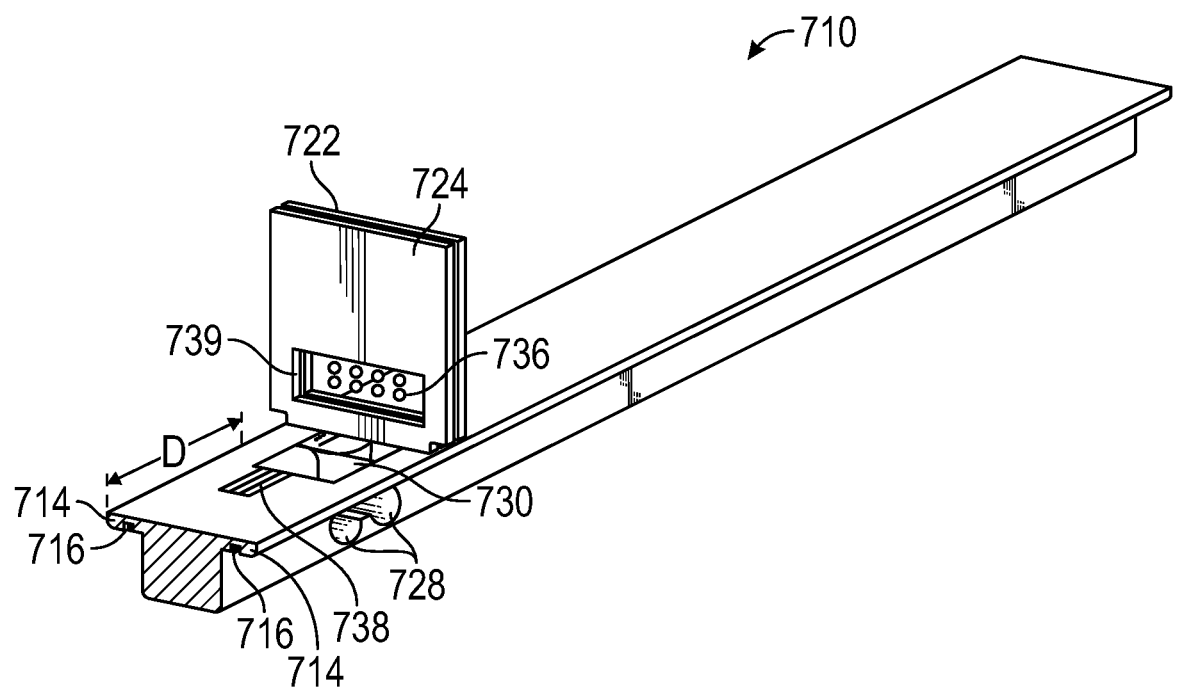
FIG. 7E is a rear perspective view of the load bar of FIG. 7A.
Figure 7F:
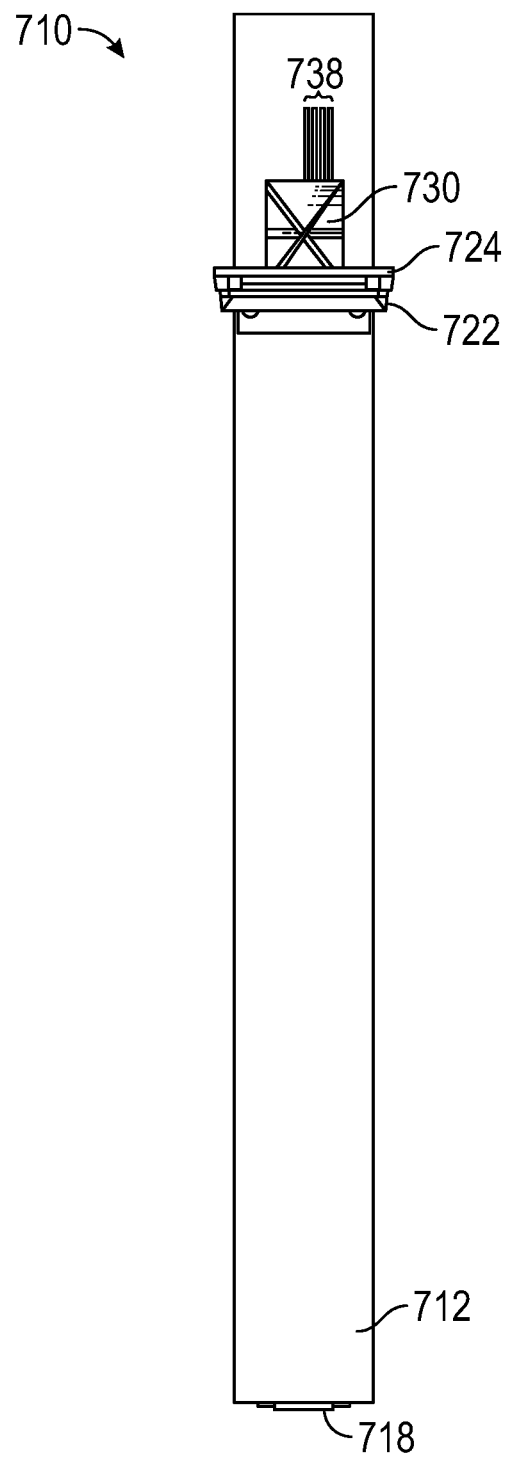
FIG. 7F is a top view of the load bar of FIG. 7A.
Figure 7G:
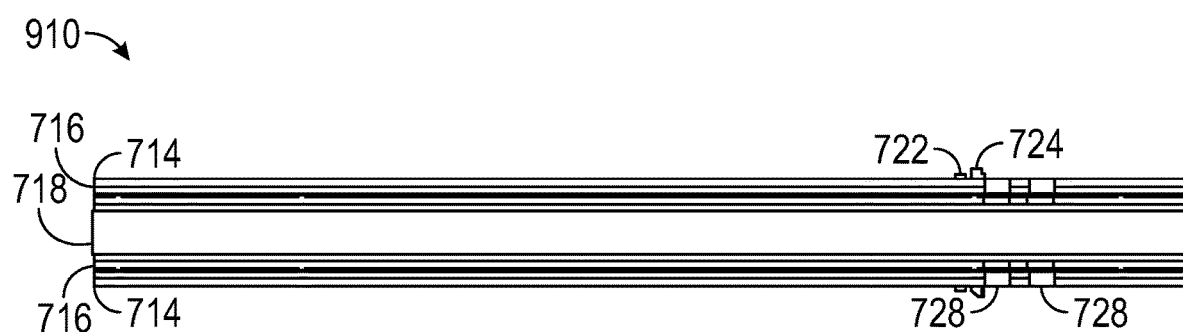
FIG. 7G is a bottom view of the load bar of FIG. 7A.

As depicted in FIGS. 7D-7E, the bracket 724 includes an opening 739 exposing a portion of the first PCB 722. This exposed portion of the first PCB 722 includes a plurality of pads 736 which are electrically connected to either electrical lines or communication lines of the automatic retail device 10. These may include strain gauge signals, power to drive the first or second PCBs 718, 722, LEDs 720, and the vibration motor 726, as well as communications to and from the first or second PCBs 718, 722 for controlling the vibration motor 726 or the LEDs 720. In practice, the back end of the load bar 710 is inserted into a rack body 301. In the rack body 301, there are connectors (for example, contact point PCBA 310) which mate with the pads 736 and ensure good contact between them, thus enabling communication and electrical signals to transfer between the rail system (or other components of the automatic retail device 10) and the load bar 710. One advantage of this arrangement is that no electrical wires are needed to form these connections, and essentially the load bar 710 is plug-and-play into rack assembly 300, thus requiring no tools or other features to install, replace, or establish electrical connections between the components of the load bar 710 and the remaining components of the automatic retail device 10. This structure and feature, of course, is also available for load bar 500 although not previously described.

Additionally, one feature of the load bar 710 is the depth to which it can be inserted into a mating feature on the rail system (e.g., rack body 301). As depicted in FIG. 7E, the depth "D", including the entire distance up to the strain gauge 730 may be received into the mating feature of the rack body 301. Also shown in FIG. 7E are a number of wires 738 which connect to the strain gauge 730 and which may be power or communications lines. Though three are shown, other numbers of wires 738 are contemplated. For example, the use of two communications lines and a positive and negative power lines are within the scope of the present disclosure.

Figure 8A:
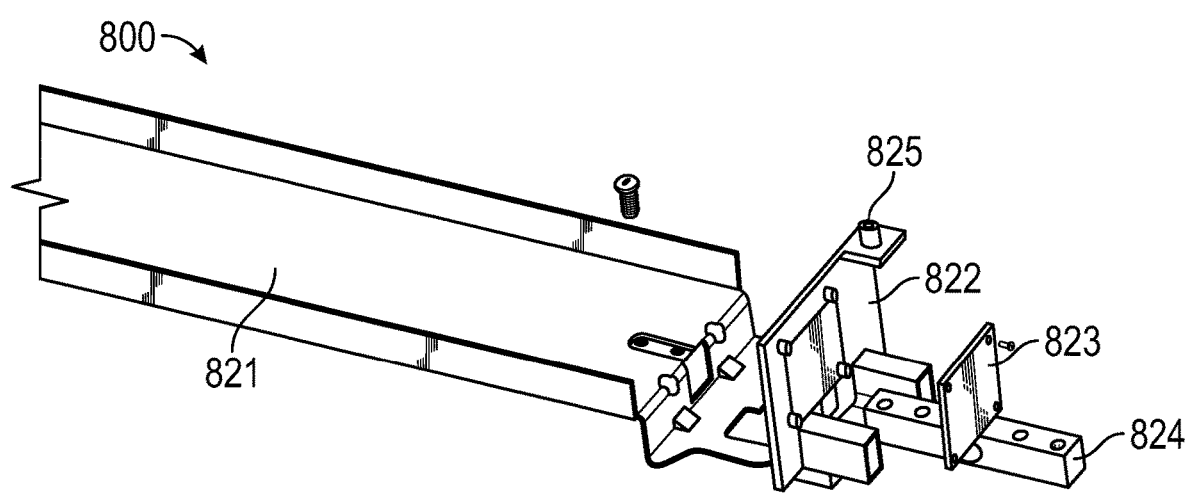
FIG. 8A is a rear perspective view, with parts separated, of a load bar including a tray and a load cell in accordance with another aspect of the present disclosure for use with the automatic retail device of FIG. 1.
Figure 8B:
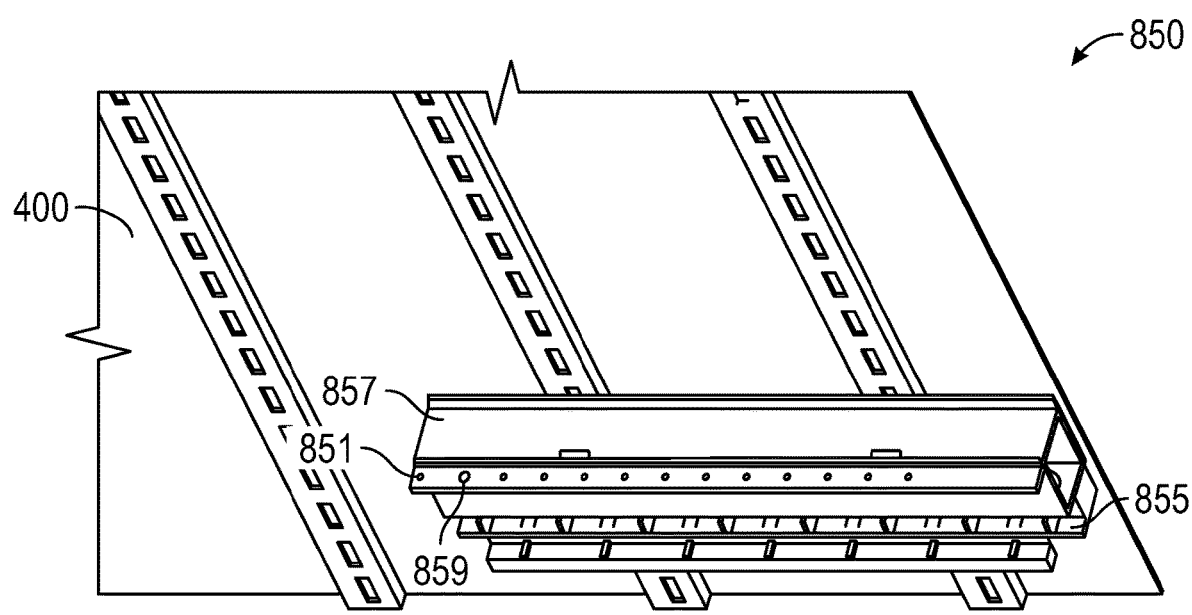
FIG. 8B is a top front perspective view of a rack assembly, mounted to a back wall of an automatic retail device, for use with the load bar of FIG. 8A.
Figure 8C:
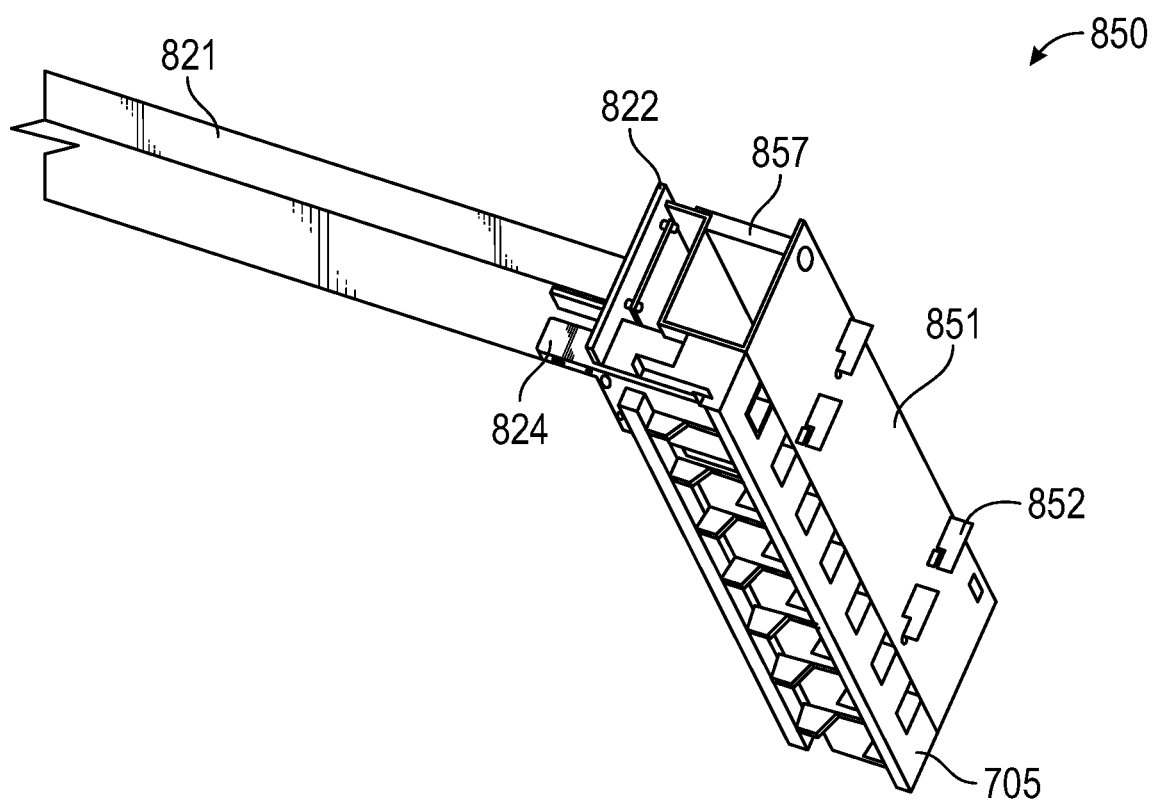
FIG. 8C is a bottom rear perspective view of the rack assembly of FIG. 8B with the load bar of FIG. 8A mounted thereto.

Embodiment 4: Turning now to FIGS. 8A-8C, a load bar 800 is shown which mounts to a rack assembly 850, similar to rack assembly 300 described above. The rack assembly 850 is configured to support a plurality of load bars 800 and is also configured to mount to the back wall 400 of the automatic retail device 10 via protrusions 852 (for example, hooks) disposed on a backside of the rack body 851.

The load bar 820 includes a tray 821, which may be plastic or stamped metal, and a tray interface 822 which supports a printed circuit board 823 (for example, first PCB 520 shown in FIG. 3A) and a load cell 824. The tray 821 is configured to support a bin (previously described) thereon or directly support product thereon. The load bar 800 is supported in the rack body 851 by the load cell 824. In particular, the rack assembly 850 includes a shelf interface 855 which receives the load cell 824 of the load bar 800 and mechanically secures the load bar 800 to the rack body 851. In one aspect, the rack body 851 includes a plurality of openings 859 (for example, threaded screw holes) formed on a flange of the rack body 851. Each opening 859 of the rack body 851 is configured to align with a respective opening 829 of the tray interface 822, when the load bar 800 is mounted to the rack body 821. When mounted, a screw or other fastening element may be used to secure the load bar 800 to the rack body 851 via respective holes 829 and 859. The rack assembly 850 also includes a moisture cover 857 which prevents ingress of moisture to the interior of the rack body 851 and the electronics housed therein. The details of the electronics in the rack assembly 850 will not be described as they are identical to the electronics of the rack assembly 300 described above.

The rack assembly 850 is mounted to a back wall 400 having a plurality of openings for receiving protrusions 852 formed on the rack body 851. The combination of the components of the load bar 800 and the combination of the components of the rack assembly 850 can be assembled without any tools. Additionally, the combination of the load bar 800 to the rack assembly 850 may also be assembled without any tools. In at least one embodiment, each row of load bars 800 is supported by two rail systems which are electronically connected and in communication. This separation of the rails allows for elimination of one half row for the stocking of a tall item on half a shelf width and two shorter items next to it, thus minimizing lost space in stocking items.

One aspect of this embodiment (and the others described above) is that the automatic retail device 10 of FIG. 1 can be configured to receive a variety of sizes, heights, and widths of products as necessary for the user. For example, the automatic retail device 10 may be arranged to have six rows of eight load bars 800, each being the same size (this size is referred to as the single size). Each load bar 800 has its own load cell 824 for weighing the contents stocked on the respective tray 821. However, the present disclosure is not limited to load bars 800 and trays 821 of the single size, and contemplates a variety of sizes including half-size (FIG. 6A), double, and four times single size. Each weight load bar 800 is supported by a single load cell 824, though multiple load cells 824 may also be used without departing from the scope of the disclosure. Further, the use of the half-size shelves coupled with products of relatively low height can enable a large number of different items to be stocked in a single automatic retail device 10. For example, in one embodiment up to fifteen rows of load bars 800, each row having eighteen shelves, results in the ability to stock two hundred and seventy different individual item types in a single automatic retail device 10. In contrast, the embodiment depicted in FIG. 1 permits the vending of forty eight individual items.

Each load cell 824 may have different weight sensitivities for example 5 KG, 10KG, 20 KG, up to 50 KG as appropriate for the desired products for stocking. The load bar 800 has a variety of functionalities that may be employed to assist a user (whether it is a stocking person, purchaser, seller, etc.) in identifying a desired product. As described above, one feature is the use of LED red, green, and blue lighting in the tray 821. To this end, load bar 800 may also include a printed circuit board similar to first printed circuit board 520 and/or second printed circuit board 530 described above. A second feature is the use of a vibration driver to vibrate an individual load bar 800. This feature may be particularly useful for the blind and visually impaired allowing use of the system.

In one aspect, the load bar 800 includes a spring latch 825 on its tray interface 822. The spring latch 825 is configured to be used to easily secure and release the load bar 800 to and from the rack body 851. In particular, the spring latch 825 is configured to align with a respective hole 859 of the rack body 851 and a portion of the spring latch 825 passes through the aligned hole 859, when the load bar 800 is mounted to the rack body 851 to releasably secure the load bar 800 to the rack body 851. Upon lifting (or in some cases, depressing) the spring latch 825, the load bar 800 may be pulled outward to separate the load bar 800 from the rack body 851. In this respect, the use of tools is not required to mount or remove the load bar 800 to and from the rack body 851.

Figure 9C:
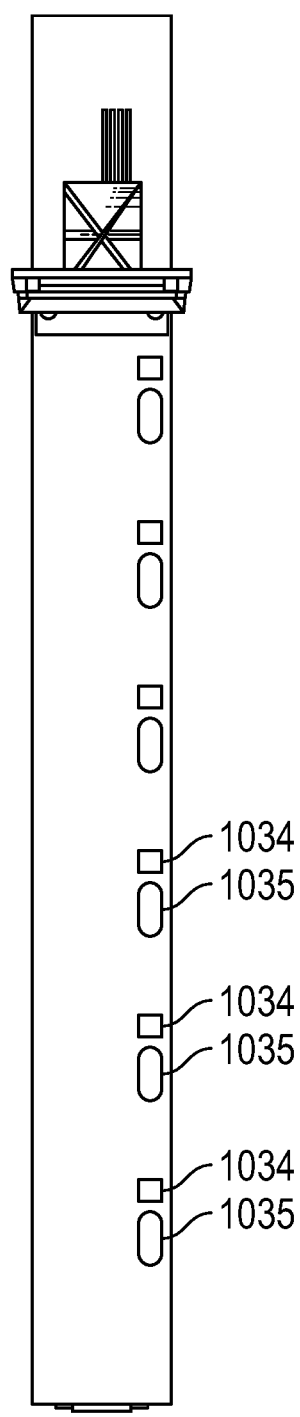
FIG. 9C is a top view of another aspect of a load bar configured to releasably lock a plurality of boots thereto.

Embodiment 5: Turning now to FIGS. 9A-9C, a load bar 1000 may be used in the automatic retail device 10 which is designed to releasably lock one or more boots 1100 thereto. Although described and illustrated as supporting boots 1100, other supporting structures such as bins, trays, or blister packs may be used. Each boot 1100 supported by the load bar 1000 is locked, or otherwise securely fastened to the load bar 1000, to prevent removal of the boot 1100 from the load bar 1000 unless the boot 1100 is unlocked from the load bar 1000 by the automatic retail device 10. The boot 1100 is configured to store a product 1500 or products therein. In one aspect, the boot 1100 is adhered to the product(s) 1500 using adhesive which prevents the removal of the product(s) 1500 from the boot 1100. Such an arrangement is particularly useful for high value items and medications stocked in the automatic retail device 10.

The load bar 1000 is similar to the other load bars described herein, and therefore will not be described in detail for brevity. In one aspect, a slot 1020 is defined along a partial length of the load bar 1000. A protrusion 1104 extending from the bottom of the boot 1100 defined an opening 1106 therethrough and is configured to be positioned within the slot 1020 when the boot 1100 rests atop the load bar 1100. A locking element 1030 of the load bar 1000 passes through the opening 1106 defined by the protrusion 1104 of the boot 1100 to secure the boot 1100 to the load bar 1000 and prevent its removal therefrom.

In one aspect, referring to FIG. 9A and FIG. 9B, the protrusion 1104, and in turn the opening 1106, may be front-facing. In this configuration, the locking element 1030 may be longitudinally telescoping, from a proximal portion of the load bar 1000 to a distal portion of the load bar 1000, such that the locking element 1030 may pass through a plurality of openings 1106 of protrusions 1104 (of multiple boots 1100 positioned along a length of the load bar 1000). Alternatively, also in the front-facing configuration, a plurality of locking elements 1030 may be included, where each locking element 1030 is configured to pass through an opening 1106 of a protrusion 1104 of a respective boot 1100.

In another aspect, referring to FIG. 9B and FIG. 9C, the protrusion 1104, and in turn the opening 1106, is side-facing. In this configuration, the locking element 1030 (or elements) may pass through the respective openings 1106 in a horizontal direction, transverse the longitudinal axis of the load bar 1000. In this configuration, the load bar 1000 includes a plurality of actuators 1034 assigned to a respective opening 1035 in the surface of the load bar 1000, where each actuator 1034 is individually controlled by the automatic retail device 10 to lock and unlock upon receiving an appropriate command. This configuration including individual actuators 1034 is not limited to a side-facing protrusion 1104 and may also be used with a front-facing configuration.

The load bar 1000 may be relative narrow and may be configured to receive hanging items or to support items on a top surface. Specifically, in one aspect, blister packs may be received on the load bar 1000 by the use of hooks which can be received in notches formed on either side, or both sides, of the load bar 1000. Hook structures formed of relatively hard plastic may be adhered to blister packs using very tough glue or other adhesives. These types of hooks may be used, though such hooks could also be configured and formed directly in the blister packs during manufacturing.

Still further, the load bar 1000 may be machined with individual latches formed along its length. These latches may be useful for high dollar items and may mate with boots 1100 (e.g., bins or trays) that can be adhered to the bottoms of high value products. In this way, when a user wishes to purchase these high value items, extra care can be taken to limit their release from the automatic retail device 10 unless specific access is granted. This may take the form of a communication with the AI, an acknowledgement on the touch screen, recording of a verbal OK, insertion of a PIN, or other actions by the automatic retail device 10. Only after one of such actions takes place will the latch (or locking element 1030, described above) be electronically released and the user will be able to remove the boot 1100, along with the product stored therein or adhered thereto, from the load bar 1000. The boots 1100 that are adhered to products may have a feature which mates with the latch (e.g., locking element 1030) and prevents the item in the boot 1100 from being removed without the latch being unlocked.

The invention claimed is:

1. A support assembly for use in an automatic retail device, the support assembly comprising:
    a plurality of bins, each bin configured for support by a support structure, the support structure configured to releasably secure to an internal surface of the automatic retail device;
    a plurality of weight sensors associated with each of the plurality of bins, supported by the support structure, and configured to sense a weight of products in the bin, to detect a change in weight upon removal of an item from the bin, and to transmit a signal indicative of a change in weight of products in the bin to a main controller of the automatic retail device; and
    a light source mounted to the support structure and configured to receive signals from the main controller; and
    a light pipe associated with each bin, wherein the light pipe conducts light from the light source and projects the light on an end portion of the bin to provide an indication of a location of a product to a user in response to signals received from the main controller.

2. The support assembly of claim 1, further comprising a vibration motor operably coupled to a each of the plurality of bins, the vibration motor configured to selectively create a tactile vibratory or audible effect to the plurality of bins.

3. The support assembly of claim 1, wherein each of the plurality of bins includes a spring loaded pusher positioned therein, the spring loaded pusher configured to distally advance products positioned in the bin.

4. The support assembly of claim 3, wherein at least one of the plurality of bins includes a plurality of spring-loaded pushers.

5. The support assembly of claim 4, wherein the spring-loaded pushers include a pusher plate that is sized for the product in the bin.

6. The support assembly of claim 1, wherein the light source is mounted on a printed circuit board in communication with the main controller.

7. The support assembly of claim 1, wherein the distal end of the bin is formed of an acrylic material.

8. The support assembly of claim 7, wherein the acrylic material on the distal end of the bin forms a lens.

9. The support assembly of claim 8, wherein the acrylic material is etched to present a lighted display upon receiving light from the light source.

10. The support assembly of claim 9, wherein the lighted display is a logo of the goods in the bin.

11. e support assembly of claim 1, wherein the light pipe is a fiber optic component.

12. The support assembly of claim 1, wherein the light pipe is configured to enable transmission of light through the bin.

* * * * *